United States Patent [19]

Raz

[11] Patent Number: 5,504,900
[45] Date of Patent: Apr. 2, 1996

[54] COMMITMENT ORDERING FOR GUARANTEEING SERIALIZABILITY ACROSS DISTRIBUTED TRANSACTIONS

[75] Inventor: Yoav Raz, Newton, Mass.

[73] Assignee: Digital Equipment Corporation, Maynard, Mass.

[21] Appl. No.: 349,474

[22] Filed: Dec. 5, 1994

Related U.S. Application Data

[63] Continuation of Ser. No. 703,394, May 21, 1991, abandoned.

[51] Int. Cl.$^6$ .............................. G06F 12/14; G06F 12/16
[52] U.S. Cl. .................... 395/650; 395/600; 364/DIG. 2; 364/974.7; 364/969
[58] Field of Search ..................................... 395/600, 650, 395/700

[56] References Cited

U.S. PATENT DOCUMENTS

| | | | |
|---|---|---|---|
| 4,224,664 | 9/1980 | Trinchieri | 364/200 |
| 4,249,241 | 2/1981 | Aberle et al. | 364/200 |
| 4,627,019 | 12/1986 | Ng | 364/900 |
| 4,881,166 | 11/1989 | Thompson et al. | 364/200 |
| 5,193,188 | 3/1993 | Franaszek et al. | 395/650 |
| 5,212,788 | 5/1993 | Lomet et al. | 395/600 |
| 5,263,156 | 11/1993 | Bowen et al. | 395/600 |

FOREIGN PATENT DOCUMENTS 0457112  11/1991  European Pat. Off. .......... G06F 9/46

OTHER PUBLICATIONS

Vassos Hadzilacos, "A Knowledge Theoretic Analysis of Atomic Commitment Protocols," Proc. of the Sixth ACM Symposium on Principles of Database Systems, Association for Computing Machinery, New York, NY, Mar. 23–25, 1987, pp. 129–134.

Joseph Y. Halpern, "Using Reasoning about Knowledge to Analyze Distributed Systems," Research Report RJ 5522 (56421) Mar. 3, 1987, Computer Science, IBM Almaden Research Center, San Jose, California, 1987.

Lampson et al., "Crash Recovery in a Distributed Data Storage System," Technical Report, Xerox, Palo Alto Research Center, Palo Alto, California, 1986.

Litwin et al., "Flexible Concurrency Control Using Value Dates," in Integration of Information Systems: Bridging Heterogeneous Databases, ed. A. Gupta, IEEE Press, IEEE, New York, NY, 1989, pp. 144–145.

(List continued on next page.)

*Primary Examiner*—Kevin A. Kriess
*Assistant Examiner*—Kakali Chaki
*Attorney, Agent, or Firm*—Arnold, White & Durkee

[57] ABSTRACT

Serializability across distributed transactions is guaranteed by selectively committing and aborting or delaying transactions to enforce an order of commitment that is the same as an order of performance of conflicting component operations of the transactions. A first memory access operation in a first transaction, for example, conflicts with a second memory access operation in a second transaction when the two memory access operations reference the same memory location and at least one of the operations is a write operation. The transaction processing system may permit a second transaction to read data written by a write operation of a first transaction before the first transaction is committed. In this case, depending on the respective order in which the two conflicting operations occur, the order of commitment is enforced, possibly by aborting either of the two transactions, to ensure that the order of commitment is the same as the order of the operations. The conflicts, for example, are detected when the addresses are determined during preparation of the transactions. The component operations may be scheduled for most efficient use of the computer system capabilities. In a multiprocessor system in which a global coordinator communicates with a plurality of transaction processors by way of "prepare" and "commit" commands, the commitment order is referenced to delay acknowledging that a transaction has been "prepared" until the transaction's "abort set" has been minimized.

42 Claims, 14 Drawing Sheets

OTHER PUBLICATIONS

Weihl, "Distributed Version Management for Read–Only Actions," IEEE Transactions on Software Engineering, vol. SE–13, No. 1, IEEE, New York, NY, Jan. 1987, pp. 55–64.

Christos Papadimitriou, *The Theory of Database Concurrency Control*, Computer Science Press, Inc., Rockville, Maryland, (1986), pp. 93–158, 201–224.

Vassos Hadzilacos, "A Theory of Reliability in Database Systems," *Journal of the ACM*, vol. 35, No. 1, January, 1988, pp. 121–145, Association for Computing Machinery, New York, New York.

Agrawal et al., "Modular Synchronization in Multiversion Databases: Version Control and Concurrency Control," *Proc. of the 1989 ACM SIGMOD Int. Conf. on Management of Data*, pp. 408–417, Portland, Oregon, June, 1989, Association for Computing Machinery, New York, N.Y.

Kung et al., "On Optimistic Methods for Concurrency Control," *ACM Transactions on Database Systems*, vol. 6, No. 2, (Jun. 1981), pp. 213–226, Association for Computing Machinery, New York, NY.

Chan et al., "Implementing Distributed Read–Only Transactions," *IEEE Transactions on Software Engineering*, vol. SE–11, No. 2, (Feb. 1985), pp. 205–212. IEEE, New York, N.Y.

Garcia–Molina et al., "Node Autonomy in Distributed Systems," (1988), pp. 158–166, IEEE, New York, N.Y.

Calton Pu, "Transactions across Heterogeneous Databases: The Super–database Architecture," pp. 1–18, (Jun. 1988), Department of Computer Science, Columbia, University, New York, N.Y.

Elmagarmid et al., "A Paradigm for Concurrency Control in Heterogeneous Distributed Database Systems," (1990), pp. 17–46, IEEE, New York, N.Y.

J. Puustjarvi, "Distributed Management of Transactions in Heterogeneous Distributed Database Systems", *BIT*, vol. 31,, No. 2, (1991), pp. 407–420.

Silberschatz et al., "Database Systems: Achievements and Opportunities," *Communications of the ACM*, vol. 34, No. 10, Association for Computing Machinery, New York, N.Y., Oct. 1991, pp. 110, 120.

Agrawal et al., "Performance Characteristics of Protocols With Ordered Shared Locks," *Proceedings of the Seventh IEEE International Conference on Data Engineering*, Institute of Electrical and Electronics Engineers, Pisctaway, New Jersey, Apr. 1991, pp. 592–601.

Agrawal et al, "Locks with Constrained Sharing," *Proceedings of the Ninth ACM Symposium on Principles of Database Systems*, Association for Computing Machinery, New York, N.Y., Apr. 1990, pp. 85–93.

Georgakopoulos et al., "On Serializability of Multidatabase Transactions through Forced Local Conflicts," Proceedings of the Seventh Int. Conf. on Data Engineering, Kobe, Japan, Apr. 1991.

Georgakopoulos et al., "Transaction Management in Multidatabase Systems," Technical Report #UH–CS–89–20, Department of Computer Science, University of Houston, Sep. 1989.

Jim Gray, "Operating Systems: An Advanced Course", Lecture Notes in Computer Science 60, (1978), pp. 394–395, 430–458.

Bernstein et al., Concurrency Control and Recovery in Database Systems, Addison–Wesley (1987), pp. 58–78.

L. Hobbs et al., *Rdb/VMS—A Comprehensive Guide*, Digital Press, Digital Equipment Corporation, Maynard, Mass., 1991.

Calton Pu, "Superdatabases for Composition of Heterogeneous Databases," 4th Int. Conf. on Data Engineering, Los Angeles, California, Feb. 1–5, 1988, pp. 548–555.

OS/Texas–11 Programming Manual, Digital Equipment Corporation, Apr. 20, 1972.

J. Eliot B. Moss, Nested Transactions, The MIT Press, 1985.

Breitart et al., "Reliable Management in a Multidatabase System," Proc. of the ACM SIGMOD conf. on Management of data, Atlantic City, New Jersey, Jun., 1990, pp. 215–224.

David Lomet, "Consistent Timestamping for Transactions in Distributed Systems", TR CRL 90/3, Digital Equipment Corp. CRL, Sep., 1990.

Amit Sheth, James Larson, "Federated Database Systems", ACM Computing Surveys, col. 22, No. 3, Sep., 1990, pp. 183–236.

Y. Breitbart, "Multidatabase Inoperability," Sigmond Record, vol. 19, No. 3, Sep. 1990, pp. 53–60.

Database System Concepts, Korth and Silberschatz, McGraw–Hill Inc., 1986, 1991, pp. 491–502.

CASE 1: $T_2$ CAN READ THE WRITE DATA OF $T_1$ ONLY AFTER $T_1$ IS COMMITED (A) $T_1$ ——($W_X$  $C_1$)— — — —
    $T_2$ ————————$R_X$—$C_2$—

(B) $T_1$ ——($W_X$  $C_1$)— — — — ⎫
    $T_2$ —$R_X$—————————$C_2$— ⎬ INCONSISTENT
                                 ⎭

CASE 2: $T_2$ CAN READ THE WRITE DATA OF $T_1$ BEFORE $T_1$ IS COMMITED (A) $T_1$ —— $W_X$ ———— $C_1$ — — —
    $T_2$ ———— $R_X$ ———— $C_2$ — —

(B) $T_1$ ———————— $W_X$ — $C_1$ — — — ⎫
    $T_2$ — $R_X$ ———————— $C_2$ — — ⎬ INCONSISTENT
                                       ⎭

(C) $T_1$ ———————— $W_X$ ———— $C_1$ — —
    $T_2$ — $R_X$ ———————— $C_2$ — — —

(D) $T_1$ —— $W_X$ ———————— $C_1$ — — ⎫
    $T_2$ ———————— $R_X$ — $C_2$ — — ⎬ INCONSISTENT
                                       ⎭

COMMITMENT ORDERING FOR GUARANTEEING SERIALIZABILITY ACROSS DISTRIBUTED TRANSACTIONS

This application is a continuation of application Ser. No. 07/703,394 filed May 21, 1991, now abandoned.

BACKGROUND OF THE INVENTION

1. Field of the Invention

The present invention relates generally to distributed computing, and more particularly to a transaction processing system in which component operations in related transactions are distributed so that at least one operation in a second transaction is performed before a first transaction having a conflicting operation is committed. The present invention specifically concerns a method and apparatus for scheduling the performance of the conflicting operations according to available resources and ensuring that the results of the conflicting operations are committed in the same order as the order of performance of the conflicting operations.

2. Description of the Background Art

A desirable feature of a computing system is the ability to recover from partial system failures that interrupt memory write operations. If an application program has a memory write operation in progress at the time of the system failure, it is most likely that the memory record will become erroneous. To enable the recovery of memory records after a partial system failure, it is necessary for the application program to keep backup copies of the records in nonvolatile memory. When the computing system is restarted, the memory records to be recovered are replaced with the backup copies.

To facilitate the making of backup copies and the recovery of memory records, the operating system typically provides an established set of memory management procedures that can be invoked or called from an application program to define a "recovery unit." The recovery unit consists of program statements between a "START" statement and a "COMMIT" statement. All of the statements in the "recovery unit" must be completed before the memory records modified by the statements in the recovery unit are made available for subsequent processing. The "START" statement corresponds to the making of a backup copy in nonvolatile memory, and the "COMMIT" statement corresponds to switching of the backup copy with a modified version. The statements in the "recovery unit" specify operations in a single "transaction." Upon recovering from a partial system error, inspection of the nonvolatile memory will reveal that the operations in the single "transaction" are either all completed, or none of them are completed.

In a distributed computing system, the operations in a single transaction may modify files in different data bases, and the files may be shared by other processes. During the operation of the transaction, the files may be inconsistent for a time, although the files will be consistent upon completion of the transaction. A typical example is a transfer of funds from one account to another, in which a first account is debited, and at a slightly later time, another account is credited. During the interim, the two accounts are inconsistent because the sum of the two accounts does not represent the total funds in the two accounts. Due to inconsistency when files are being modified by a transaction, it is known to prevent other processes from accessing the files until the modification is finished. Recoverability can be assured in this example by performing commitment for both files at the same time and place. By changing a single flag, for example, the backup copies of each file can be replaced at the same time with the modified versions of the files. In many instances, however, it is desirable to distribute the operations in a transaction among multiple processors or processes in a computing system, and to commit the transaction by committing the operations in each process or processor while permitting some variability between the times of commitment. In these instances, an "atomic commitment protocol" is typically used to ensure recoverability. The protocol requires the exchange of information about the state of the transaction between the processors or processes. To identify the transaction being performed, the transaction is typically assigned a unique "transaction identification number."

A widely used atomic commitment protocol is known as the "two-phase commit protocol." In a somewhat elementary example of this protocol, one processor or process in the computing system is assigned the role of a coordinator which initiates a transaction. To begin a transaction, the coordinator sends a prepare command to all of the processors or processes participating in the transaction.

Upon receipt of the "prepare" command, each processor or process participating in the transaction performs a "START" operation by first placing "write locks" on memory accessed by the transaction, writes the transaction identification number into permanent memory to remember that it is prepared for the transaction, and then sends an acknowledgement back to the coordinator processor, but does not yet perform its part of the transaction. The coordinator waits for acknowledgements from all of the participants. When the coordinator receives acknowledgements from all of the participants, the coordinator records in permanent memory a list of the participants and a notation that the transaction is now being completed, and then the coordinator sends "commit" commands to all of the participants. The coordinator, however, may receive a message from a participant indicating that it cannot prepare for the transaction, or the coordinator may fail to receive acknowledgements from all of the participants after a predetermined time period, possibly after the coordinator has retransmitted the "prepare" command. In this case the coordinator transmits an "abort" command to all of the participants.

Upon receipt of the "commit" command, each participant checks its permanent memory for the transaction identification number to determine whether the participant has prepared for the transaction, and if it has, it performs its part of the transaction, and then performs a "COMMIT" operation to update the state of permanent memory and clear the transaction ID from permanent memory in one "atomic" step, and erase the write locks. Then the participant sends an acknowledgement back to the coordinator. When the coordinator receives acknowledgments from all of the participants, it erases the list of participants from permanent memory, and the transaction is finished.

In a many distributed computing systems, the processors or processes are permitted to perform multiple transactions simultaneously. In the usual case each processor or process performs transactions that are local to the processor or process, and also performs portions of global transactions. In a distributed data base system, for example, local data base queries and edits may occur locally, and some of the modifications may be made globally. A direct application of the two-phase commit protocol described above may perform satisfactorily in such a system, so long as the global transactions can be given a high priority with respect to the local transactions. But use of the read and write locks may unnecessarily restrict local transactions that could be processed concurrently.

Additional complexity is introduced when it is desired to process global transactions concurrently across multiple processors or processes in a distributed computing system. It is impractical to permit a processor or process to view a global picture of all the conflicts in all of the other processors or processes. Without a global picture, however, it is difficult for a processor or process to ensure that there is a correlation between its seriablility order and the seriability orders of the other processors or processes. Time-stamping of transaction requests and data updates is one method that has been used to address this problem of concurrency control. In general, concurrency control in a distributed computing system has been achieved at the expense of restricted autonomy of the local processors or processes, or by locking.

The problem of global deadlock also has to be addressed whenever global transactions are performed concurrently. One known solution is to provide a global transaction manager that decides whether or not to dispatch concurrent global transaction requests. An example is described Y. Breitbart et al., "Reliable Transaction Management in a Multidatabase System", *Proc. of the ACM SIGMOD conf. on Management of Data,* Atlantic City, N.J., June 1990, pp. 215–224. The global scheduler keeps track of global transaction requests for local locks on data items by using a global lock mechanism. Each global data item has a global lock associated with it. A global transaction that needs only to read a data item requests a global read-lock. Locks are conflicting if they are requested by two different transactions on the same data item and at least one of the requested locks is a write-lock. If two global transactions request conflicting global locks, the scheduler will prevent one of the transactions from proceeding because it knows that the two transactions will cause a conflict at the local site. The scheduler uses strict two-phase locking for allocating global locks to global transactions, and maintains a global "wait for graph." The "global wait for graph" is a directed graph $G=(V,E)$ whose set of vertices $V$ is a set of global transactions and an edge $T_i \rightarrow T_j$ belongs to $E$ if and only if global transaction $T_i$ waits for a global lock allocated to global transaction $T_j$. If a global transaction waits for a global lock, then the transaction state becomes "blocked" and the transaction is included in the "global wait for graph." The transaction becomes active again only after it can obtain global locks that it was waiting for. To avoid global deadlocks, the "global wait for graph" is always made acyclic. To ensure data consistency in the presence of failures, the scheduler also uses a "commit graph" and a "wait-for-commit graph" to determine when to schedule a commit operation. The commit graph $CG=<TS,E>$ is an undirected bipartite graph whose set of nodes $TS$ consists of a set of global transactions (transaction nodes) and a set of local sites (site nodes). Edges from $E$ may connect only transaction nodes with site nodes. An edge $(T_i,S_j)$ is in $E$ if and only if transaction $T_i$ was executing at site $S_j$, and the commit operation for $T_i$ has been scheduled for processing. After the commit operation for $T_i$ is completed, $T_i$ is removed from the commit graph along with all edges incidental to $T_i$. Global database consistency is assured if the commit graph does not contain any loops. The wait-for-commit graph is a directed graph $G=(V,E)$ whose set of vertices $V$ consists of a set of global transactions. An edge $T_i \rightarrow T_j$ is in $E$ if and only if $T_i$ has finished its execution, but its commit operation is still pending and $T_j$ is a transaction whose commit operation should be completed or aborted before the commit of $T_i$ can be scheduled. The scheduler uses the following algorithm for constructing the wait-for-commit graph, and in scheduling a commit operation of transaction $T_i$:

1. For each site $S_k$ in which $T_i$ is executing, temporarily add the edge $T_i \rightarrow S_k$ to the commit graph.
2. If the augmented commit graph does not contain a cycle, then the global commit operation is submitted for processing, and the temporary edges become permanent.
3. If the augmented commit graph contains a cycle then:
   a) The edges $T_i \rightarrow T_{i1}, \ldots, T_i \rightarrow T_{im}$ are inserted into the wait-for-commit graph. The set $\{T_{i1}, T_{i2}, \ldots, T_{im}\}$ consists of all the transactions which appear in the cycle which was created as a result of adding the new edges to the commit graph.
   b) Remove the temporary edges from the commit graph.

The transaction $T_i$, however, need not necessarily wait for the completion of every transaction $T_{ik}$ such that $T_i \rightarrow T_{ik}$. It may be ready to be scheduled for a commit operation after some of transactions $T_{ik}$ such that $T_i \rightarrow T_{il}$ ($0<l<r$) successfully commit (and in some cases, a successful commit of only one such transaction would be sufficient to schedule the transaction's commit!).

SUMMARY OF THE INVENTION

The present invention guarantees serializability across distributed transactions in a computing system by selectively committing and aborting the transactions to enforce an order of commitment that is the same as an order of performance of conflicting component operations of the transactions. When the transaction is committed, results of the component operations are committed to state memory. When the operation is aborted, the results of the component operations are discarded. A first memory access operation in a first transaction, for example, conflicts with a second memory access operation in a second transaction when the two memory access operations reference the same memory location and at least one of the operations is a write operation.

In a typical transaction processing system, a second transaction can read data written by a first transaction only after the second transaction has been committed. This restriction is a sufficient condition to ensure recoverability of the system. To practice the present invention in this case, when a second transaction performs a read operation before a conflicting write operation of a first transaction is committed at a time when the second transaction has not yet committed, the second transaction is aborted to ensure that the order in which the transactions are committed is not different from the order in which the conflicting operations are performed.

The present invention, however, permits the construction of a transaction processing system in which a second transaction may read data written by a write operation of a first transaction before the first transaction is committed. In this case, depending on the respective order in which the two conflicting operations occur, either of the two transactions may be aborted to ensure that the order of commitment is the same as the order of performance of the conflicting operations. Moreover, to insure recoverability, both of the transactions should be aborted in the case of the read operation following the write operation and the read operation being performed before aborting of the write operation. In general, in a transaction processing system in which a second transaction may read data written by a write operation of a first transaction, recoverability is enforced by a process of cascading aborts; the aborting of a transaction requires the additional aborting of all other transactions that have read data written by aborted transactions.

In cases where memory addresses of memory access operations are known prior to preparing the transactions, the required commitment order may be determined prior to preparation of the transactions. Otherwise, conflicts are detected when the memory addresses are determined during preparation of the transactions.

The commitment order is enforced by committing a selected transaction for which a result has been prepared, and aborting other transactions for which a result is being prepared or is prepared and for which commitment is contrary to the predefined commitment order and the committing of the selected transaction. The transaction to commit is selected, for example, by comparing priorities assigned to the transactions, by an ordering of the transactions in a list, by a commitment request from a coordinator, or by a strategy to minimize the number of other transactions that are aborted as a result of the selection. In a multiprocessor system in which a global coordinator communicates with a plurality transaction processors by way of "prepare" and "commit" commands, the minimization strategy preferably is used to delay acknowledging that a transaction has been "prepared" until the transaction's "abort set" has been minimized.

BRIEF DESCRIPTION OF THE DRAWINGS

Other objects and advantages of the invention will become apparent upon reading the following detailed description and upon reference to the drawings in which:

FIG. 3A illustrates various scheduling possibilities for conflicting memory access operations of distributed transactions for the case in which a second transaction can read the write data of a first transaction only after the first transaction is committed;

FIG. 3B illustrates various scheduling possibilities for conflicting memory access operations of distributed transactions for the case in which a second transaction can read the write data of a first transaction before the first transaction is committed;

Figure 1:
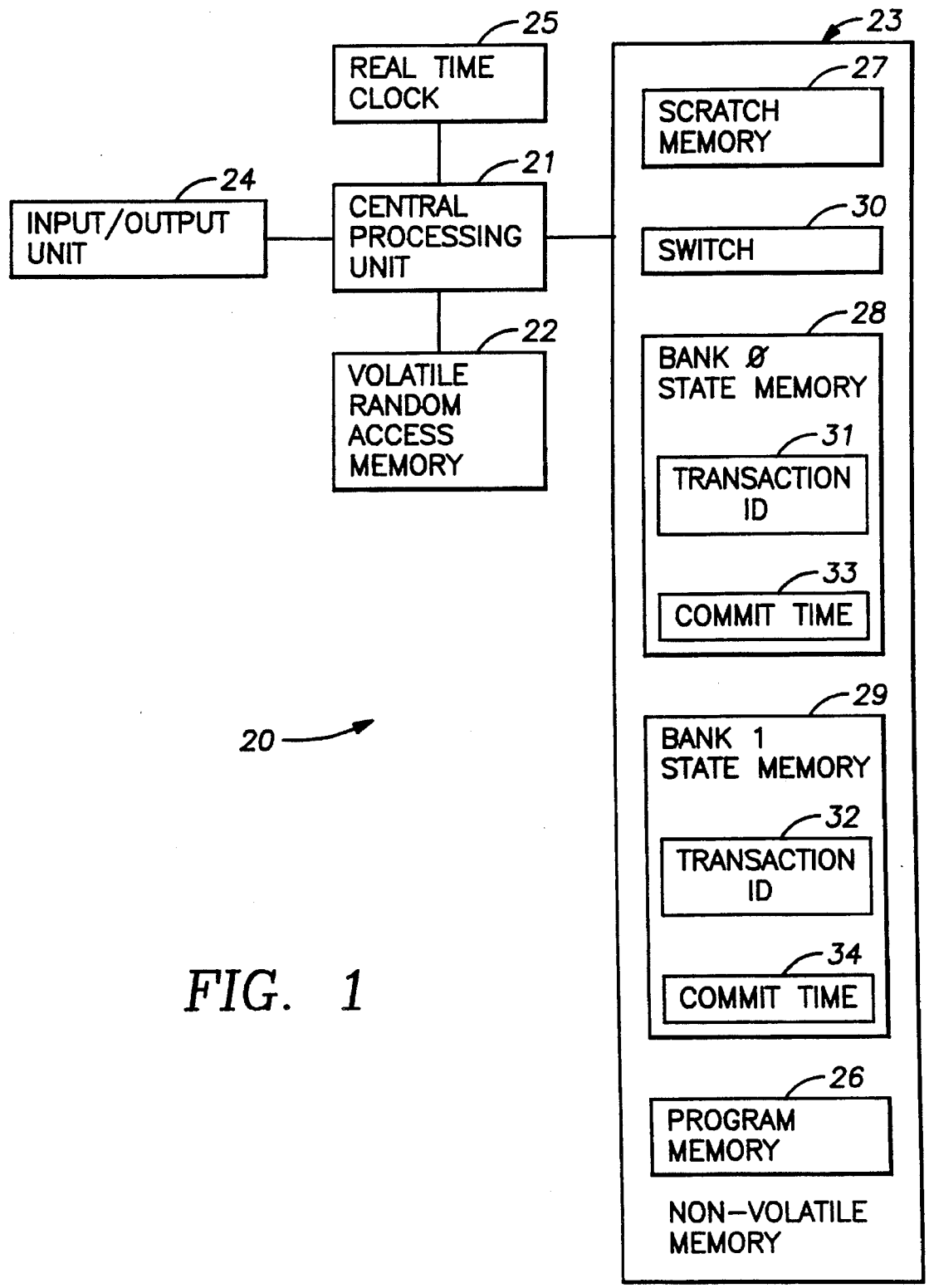
FIG. 1 is a block diagram of a digital computer configured for transaction processing.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Turning now to FIG. 1, there is shown a block diagram generally designated 20 of a digital computer configured for transaction processing. The computer 20 includes a central processing unit 21 for executing programmed instructions; a volatile random access memory 22 for holding instructions or data; a non-volatile memory 23 such as a hard disk drive, an input/output unit 24, and a real time clock 25. The non-volatile memory 23 includes a program memory 26 in which programs are stored, and a scratch memory area 27 for storing data records.

Typically, the digital computer 20 executes programs which have been transferred from the program memory 26 to the volatile random access memory 22. During the execution of a program, it is often necessary to operate upon an amount of data that exceeds the capacity of the volatile random access memory 22. In this case, data records are alternately stored and retrieved from the scratch memory area 27.

A common problem associated with the digital computer 20 is the likelihood that the execution of instructions by the central processing unit will become disrupted due to a hardware failure, software error or power failure. A power failure, for example, will cause the disappearance of data and programs stored in the volatile random access memory 22. The problem of the loss of data in the volatile random access memory 22 due to a power failure can be solved by storing back-up copies of data in the non-volatile memory 23. The back-up copies, however, must be made in such a way that considers the possibility of failure during a write operation to the non-volatile memory 23. In this case the data record affected by the write operation might have been corrupted and therefore must be discarded.

To deal with the problem of possible failure when writing to non-volatile memory, there has been established a method of programming called "transaction processing" which guarantees that a portion of the non-volatile memory (referred to hereinafter as "state memory") will either be unaffected by a transaction or will be properly updated by results of a transaction, in the presence of the failures. Transaction processing is based upon the technique of making a back-up copy of state memory before the results of a transaction are written to state memory, and also writing in non-volatile memory an indication of either a first processing phase in which the back-up copy is being made, or a second processing phase in which the results of a transaction are being written to state memory, in order to indicate which copy might have been corrupted during a failure. For making a back-up copy of state memory, for example, the non-volatile memory 23 includes two banks of state memory 28 and 29. To provide an indication of which bank of stat memory might have been corrupted by a failure, the non-volatile memory 23 includes a memory location 30 for storing a switch or flag.

When recovering from a failure, it is desirable to know the transaction that was last performed by the central processing unit 21, so that processing can be resumed from the interrupted point without repeating or skipping a transaction. For this purpose, whenever the state memory in either of the memory banks 28 or 29 is updated, a transaction identification code 31, 32 is written into the state memory along with the time 33, 34 at which the results of the transaction were first written (i.e., committed) to state memory.

Figure 2A:
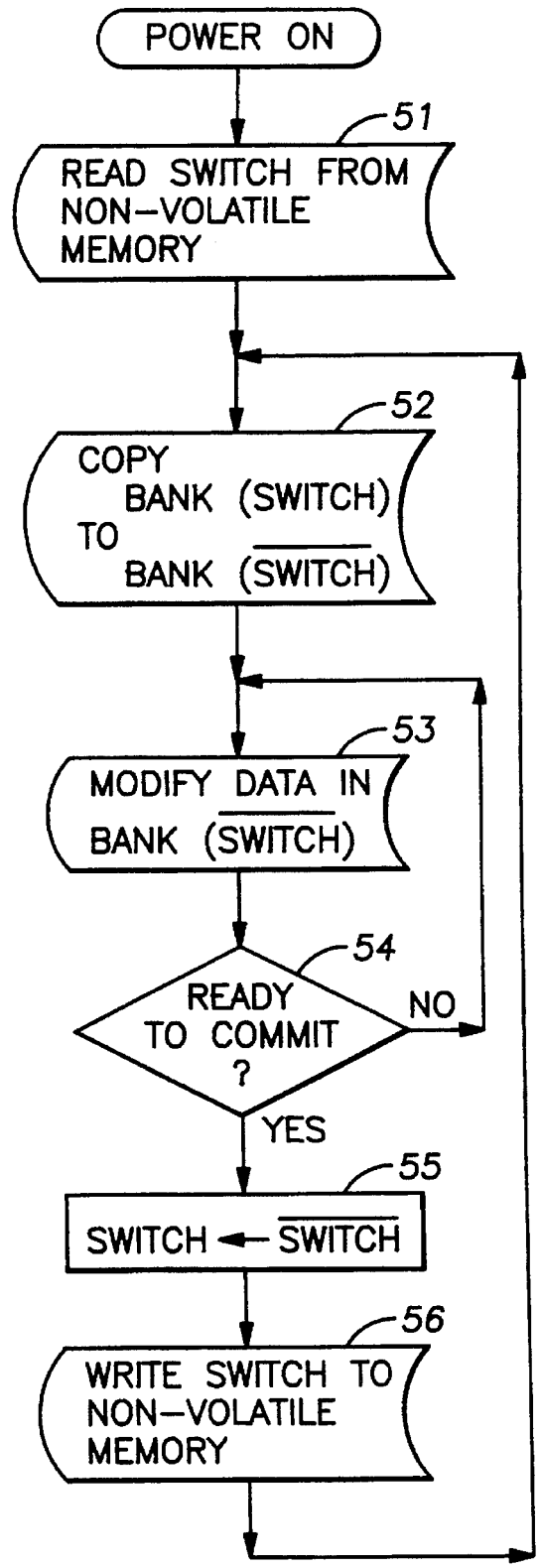
FIG. 2A is a flow chart of a procedure for performing transaction processing in the computer of FIG. 1 by switching between two banks of state memory.

Turning now to FIG. 2A, there is shown a flow chart of a procedure for guaranteeing that when recovering from a failure, the state memory of the computer 20 shown in FIG. 1 is either unaffected by a transaction or is properly updated by the result of a transaction. Assume, for example, that the computer system is turned on after a power failure. In a first step 51, the central processing unit 21 reads the value of the switch 30 stored in the non-volatile memory 23. This switch indicates which of the two banks of state memory 28, 29 might possibly have been corrupted by the power failure. In step 52, the central processing unit 21 references the value of the switch to read the bank of state memory known not to have been corrupted, and to make a "working copy" of the data in the other bank of state memory. Therefore, after step 52, both bank 28 and bank 29 of state memory have the same contents. Moreover, the transaction identifier 31, 32 and the commit time 33, 34 can be inspected to find the location in a program of the next transaction to be processed.

In step 53 that processing is continued by modifying the data in the working copy of state memory by writing results of the transaction being processed. The end of processing of the transaction is reached in step 54. To commit the results of the transaction to state memory, the value of the switch is changed in step 55, and in step 56 the changed value of the switch is written into the switch location 30 of the non-volatile memory. When viewed by the central processing unit 21 during recovery from a failure, the writing of the changed value of the switch into the non-volatile memory has the effect of insuring that the committed result of the transaction either has no effect upon the state memory, or properly updates the state memory, depending upon whether the failure occurs before or after the value of the switch has been written into the non-volatile memory. Because the value of the switch 30 is a single bit and the switch 30 is stored in a record different from the records of the banks of state memory, any failure occurring during the writing of the this single bit is inconsequential; in this case, neither of the banks of state memory should be corrupted, so the value of the switch does not matter.

The method of committing the result of a transaction as illustrated in FIG. 2A is rather inefficient when the result of a transaction modifies only a small portion of the state memory. In this case, step 52 spends a good deal of time unnecessarily copying data records that have not been modified. This unnecessary copying can be eliminated by the somewhat more complex procedure of FIG. 2B.

Figure 2B:
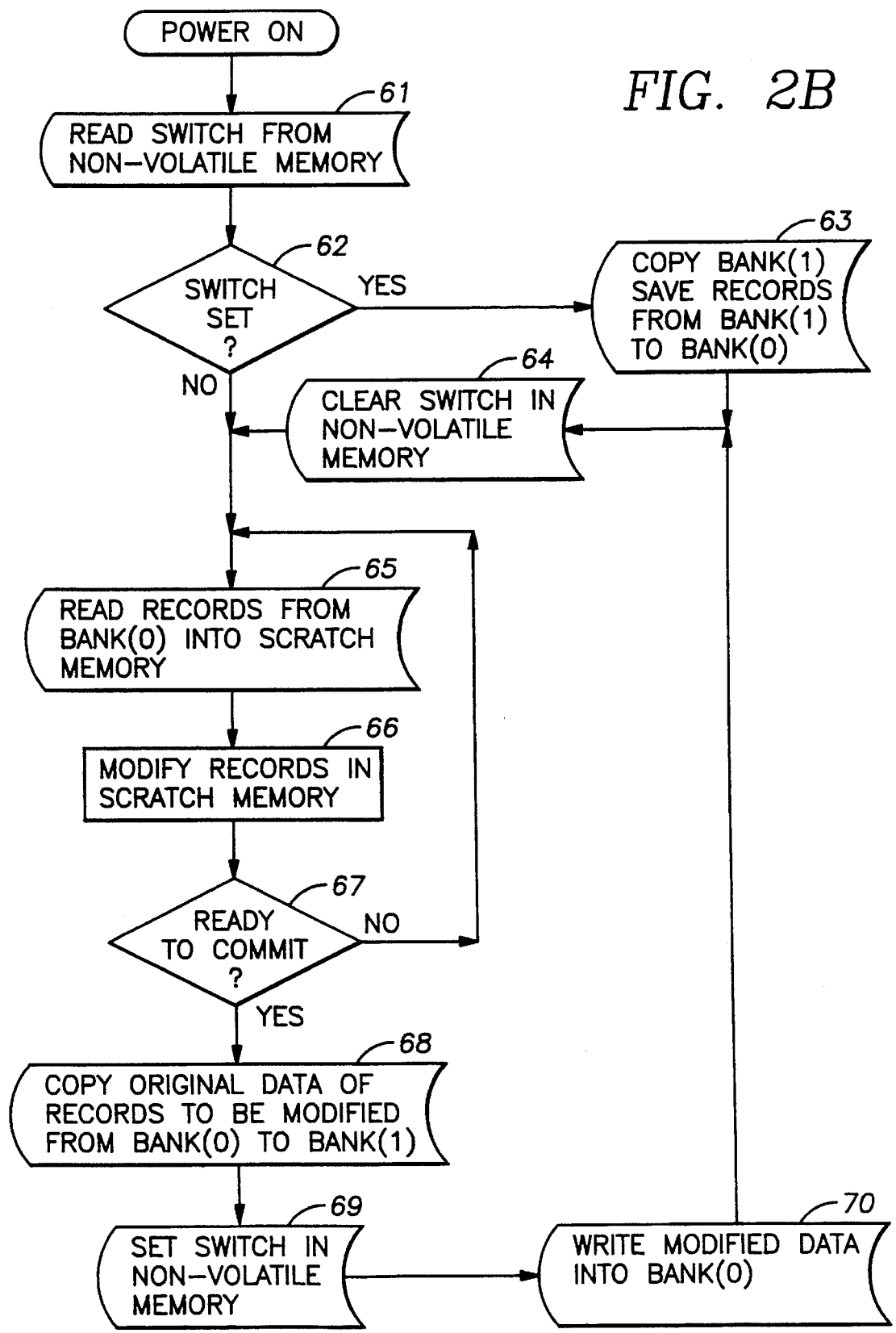
FIG. 2B is an alternative procedure for operating the Digital Computer of FIG. 1 for transaction processing by saving copies of only the data records of state memory that are modified by a transaction.

In the first step 61 of FIG. 2B, the switch is read from the non-volatile memory. Next, in step 62, the central processing unit checks whether the switch is set. If so, then a failure occurred during the processing phase in which the results of a transaction were being committed to state memory, as further described below. Therefore, in step 63 records saved in the state memory bank 29 are copied to state memory bank 28. Then, in step 64, the switch in non-volatile memory is cleared.

To process a transaction, in step 65, data records are read from the state memory bank 28 and transferred into the scratch memory area 27. Then in step 66 the records in scratch memory are modified in accordance with results of the transaction. When the transaction is finished, as found in step 67, then in step 68, original data of records to be modified are copied from state memory bank 28 to the state memory bank 29. Then in step 69 the switch is set in non-volatile memory. Then in step 70 the results of the transaction are committed by writing the modified data into the state memory bank 28. Finally, in step 64, the switch is cleared in non-volatile memory. Processing of the next transaction begins in step 65.

As described above with respect to FIG. 2A or FIG. 2B, it is assumed that transactions are processed in sequence by the central processing unit 21 of the computer 20 in FIG. 1. The present invention, however, permits the processing of transactions to be distributed in such a way that the results for a second transaction may be prepared before the results of a first transaction are committed. As will be further described below with reference to FIG. 5, the present invention permits the use of a transaction scheduler incorporating a real-time operating system or scheduler to more effectively keep the central processing unit busy during the time that it would otherwise be waiting for the completion of input/output or memory access operations. By permitting a second transaction to perform component operations before a first transaction has committed its results, however, introduces a problem of inconsistency unless the scheduling of operations and commitment of the transactions conforms to a certain commitment ordering. In particular, the transactions should be committed in the same order as the order in which respective conflicting (i.e. non-commuting) operations are performed.

When the scheduling of component operations and the commitment of transactions has this property of "commitment ordering", it can also be shown that in a distributed processing system (as further described below in connection with FIG. 4B), global serializability is guaranteed when only "atomic commitment" is used to coordinate the various processors in the system. This is demonstrated by a rather elaborate mathematical proof, which is appended to the present specification. From a practical standpoint, this result means that the advantages of the present invention can be applied to a conventional distributed transaction processing system by modifying each transaction processor or node in the system without modification of the global scheduler or the protocol for distributing global transactions through the system.

A conventional transaction processing system insures that a second transaction can read the write data of a first transaction only after the first transaction is committed. This is a sufficient but not necessary condition to insure recoverability. In a first embodiment of the present invention, this condition can also be maintained to minimize the amount of non-volatile memory required and to avoid what is known as "cascading aborts" to achieve recoverability. In this first embodiment, transactions are essentially processed as shown in FIG. 2B wherein the read operations read records from the bank 28 of state memory and transfer them to scratch memory as shown in step 65 of FIG. 2B. The write operations are prepared by modifying records in memory as shown in step 66 of FIG. 2B, but the results of each transaction are kept in separate records in scratch memory 27, even though the write operations of different transactions reference the same records in state memory. This is done because the effect that such conflicting write operations will have upon the state memory is determined by the order in which the transactions are committed.

FIG. 3A shows three different possibilities for the scheduling of a first transaction having a write operation and a second transaction having a conflicting read operation. In general, two operations are conflicting when they are memory access operations that access the same location in state memory and at least one of the operations is a write operation. By inspection it can be seen that of the three scheduling possibilities, the possibility (b) violates the commitment ordering requirement and therefore may cause inconsistency in the state of the state memory. Due to the fact that the write operation $W_x$ does not commute with the read operation $R_x$, the result for the transaction $T_2$ for the scheduling possibility (b) may be different from the result for the transaction $T_2$ for the scheduling possibility (a). To obtain consistent results, the present invention permits conflicting operations of two transactions to be scheduled in a selected order to most efficiently use resources available to the central processing unit, but insures consistency by enforcing a commitment order that is the same as the order in which the conflicting operations are performed. Inconsistent scheduling possibilities, such as the possibility (b) in FIG. 3A, are prohibited by aborting a conflicting transaction when a selected transaction is committed, or by delaying commitment of a selected transaction until after the conflicting transaction is committed.

In the example of FIG. 3A, for example, suppose that the first operation scheduled is a read operation $R_x$ of the second transaction $T_2$, as shown in possibilities (b) and (c). If the transaction $T_2$ is committed before the transaction $T_1$ as shown in possibility (c), no inconsistency will result because the scheduling is in conformance with commitment ordering. If, however, the first transaction $T_1$ is committed before the second transaction $T_2$ as shown in possibility (b), then the second transaction $T_2$ must be aborted because otherwise commitment of the second transaction $T_2$ would violate commitment ordering and may lead to inconsistent results.

The present invention further permits the scheduling of operations such that a second transaction $T_2$ can read the write data of a first transaction $T_1$ before the first transaction $T_1$ is committed. In this case recoverability can be guaranteed by a process of cascading aborts, as further described below with reference to FIGS. 12 and 13. For the case of a first transaction $T_1$ having a write operation $W_x$ and a second transaction $T_2$ having a conflicting read operation $R_x$, there are six scheduling possibilities, denoted in FIG. 3B as (a) to (f). Two of these scheduling possibilities (b) and (d) violate commitment ordering and therefore may lead to inconsistent results. The present invention prevents these scheduling possibilities from occurring by determining the order in which the conflicting operations are performed and then delaying commitment of a selected transaction or aborting a conflicting operation if necessary to enforce commitment ordering. To permit the read operation in the second transaction to read the write data of a write operation in a first transaction, the digital computer 20 of FIG. 1, for example, maintains a working copy of state memory in the scratch memory area 27. Whenever a write operation is performed, the results of the write operation are written to the working copy of state memory in the scratch memory area, and also separate copies of the written records are kept in scratch memory in association with each transaction. When the transaction is committed, only then are the results of the write operation of the transaction written into state memory. In the embodiment of Case 2 the read operations reference the working copy of state memory in scratch memory, instead of the state memory itself as in Case 1, so that in Case 2 the read operations read the write data of prior write operations.

Figure 4A:
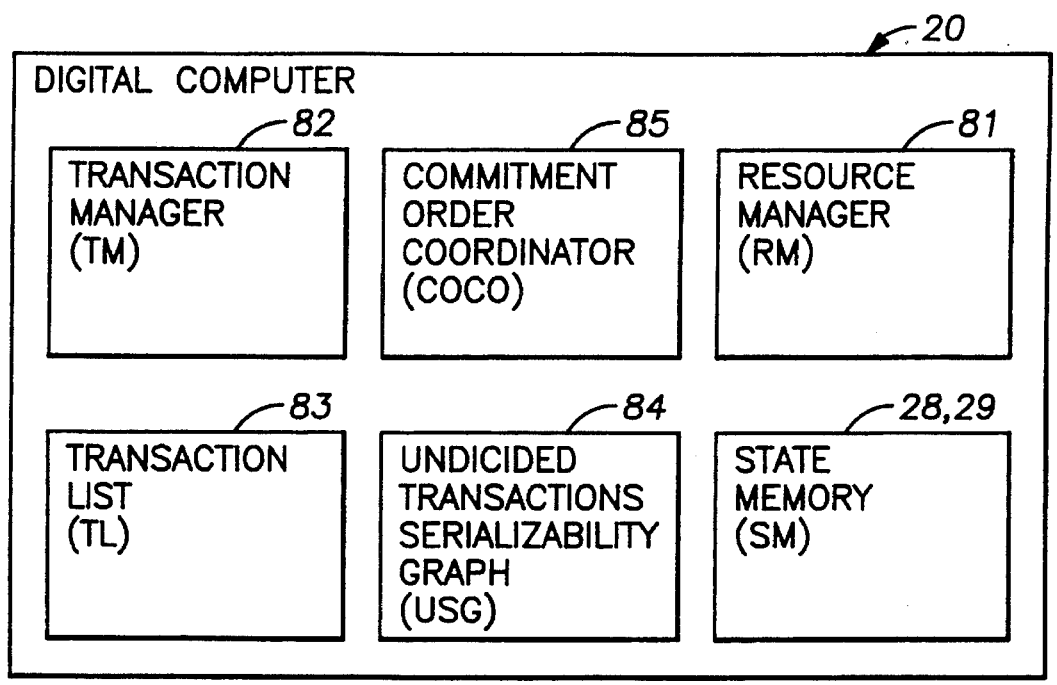
FIG. 4A shows a digital computer configured in accordance with the present invention to enforce a commitment ordering in which distributed transactions are committed in the order in which conflicting component operations are performed.

Turning now to FIG. 4A, there is shown a block diagram of the programming and data structures used in the digital computer 20 of FIG. 1. for scheduling transactions and enforcing commitment ordering. To commit the results of transactions to state memory 28, 29 and to recover from failures, the digital computer is provided with a resource manager (RM) 81 that, for example, performs the operations shown in FIG. 2B. In general, a resource manager (RM) is a software component that manages state memory resources affected by committing transactions in such a way that the memory state of the resources can be restored before the transaction is committed by effectively undoing all of the changes introduced by the transaction. In other words, the resource manager ensures that the transactions have the property of "atomicity" or "all or nothing" semantics upon its state memory resources. A resource is typically, but not necessarily, a data item or a data object. Examples of resource managers are typically found in data base systems (DSB's), list managers, and cache managers.

Figure 8:
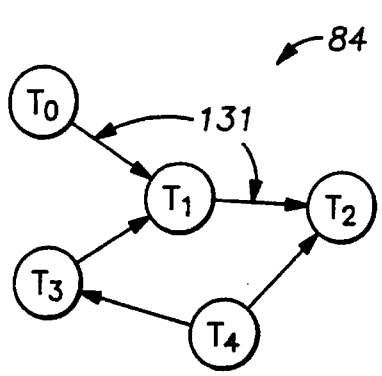
FIG. 8 is a pictorial diagram of the graph corresponding to the data stored in the data structure of FIG. 7.

To schedule the component operations of transactions in the most efficient order based on available resources of the computer, there is provided a transaction scheduler (TS) 82. Preferably the transaction scheduler 82 includes a kind of real-time operating system that manages a transaction list (TL) 83 as further described below with reference to FIG. 5. Preferably the presence of conflicting operations is detected in real time when the transactions are performed, as further described below with reference to FIG. 11. In accordance with commitment ordering, the order in which conflicting operations are performed determines a required order of commitment of transactions, and this required order of commitment is recorded in an undecided transactions serializability graph (USG) 84 which is a data structure in memory, and which is described further below with reference to FIGS. 7 and 8. (The "undecided" transactions are the transactions which are yet committed or aborted.) To enforce the commitment order, transactions are selected for commitment and transactions are selectively aborted by a commitment order coordinator (COCO) 85, which is further described below with reference to FIGS. 10 and 15.

Figure 4B:
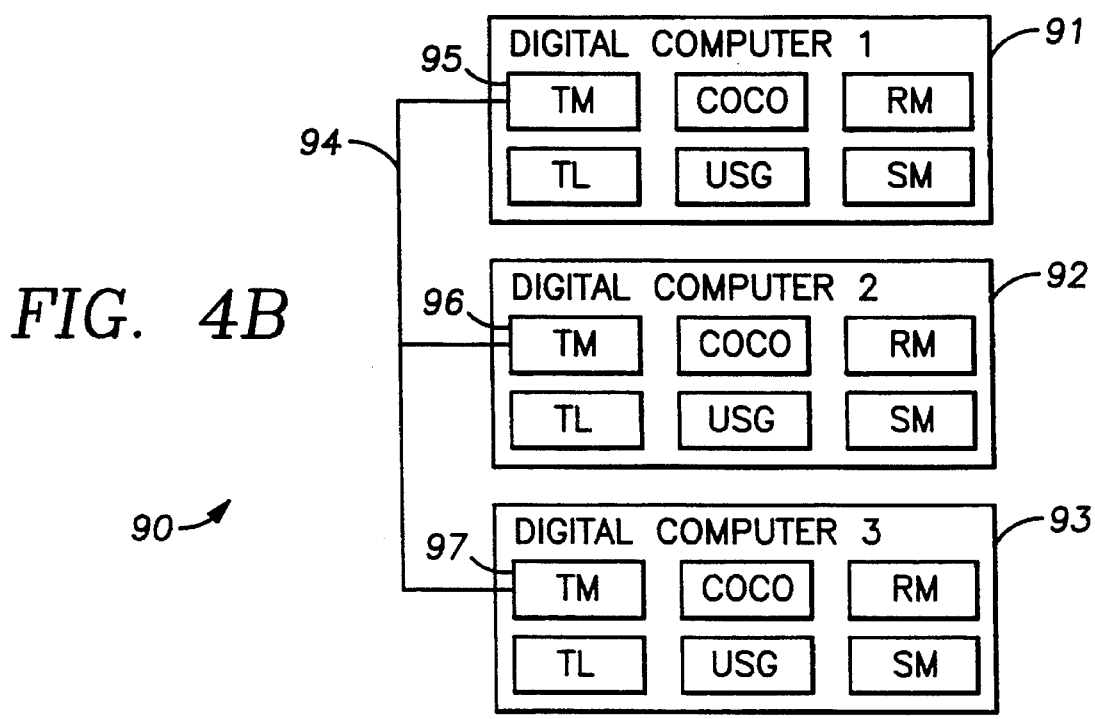
FIG. 4B illustrates a distributed computing system including a plurality of the digital computers as shown in FIG. 4A.

The present invention can be used in a single processing system in which a plurality of transactions are performed concurrently by scheduling component operations, or in a multiprocessor system in which component operations of the same transaction are performed concurrently in different processors. A multi-processor system 90 is illustrated in FIG. 4B. In this case, three digital computers 91, 92, 93 are interconnected through a communication channel 94, and the communication is controlled by the transaction schedulers (TS) 95, 96, 97. In the multi-processor system 90, any one of the transaction schedulers 95, 96, 97 may assume the role of a coordinator and issue global transactions to the other transaction schedulers. These global transactions are coordinated, for example, according to the well-known two phase commit protocol, as was described above with reference to the background art, and as further described below with reference to FIGS. 14, 15 and 16.

The transaction schedulers may also exchange state information over the communication channel 94. In particular, transaction processing systems generally fall within two broad categories called database management systems and object oriented systems, depending upon whether or not state memory information is resident in the non-volatile memory files of a particular one of the digital computers 91, 92, 93, or whether the state information is associated with predefined objects which may be passed from one computer to another. The present invention, however, is applicable to both types of systems because the present invention more particularly concerns the scheduling of component operations in the transactions and the enforcement of commitment ordering, and is not particularly concerned with where the state memory is physically located or maintained in a distributed processing system.

Figure 5:
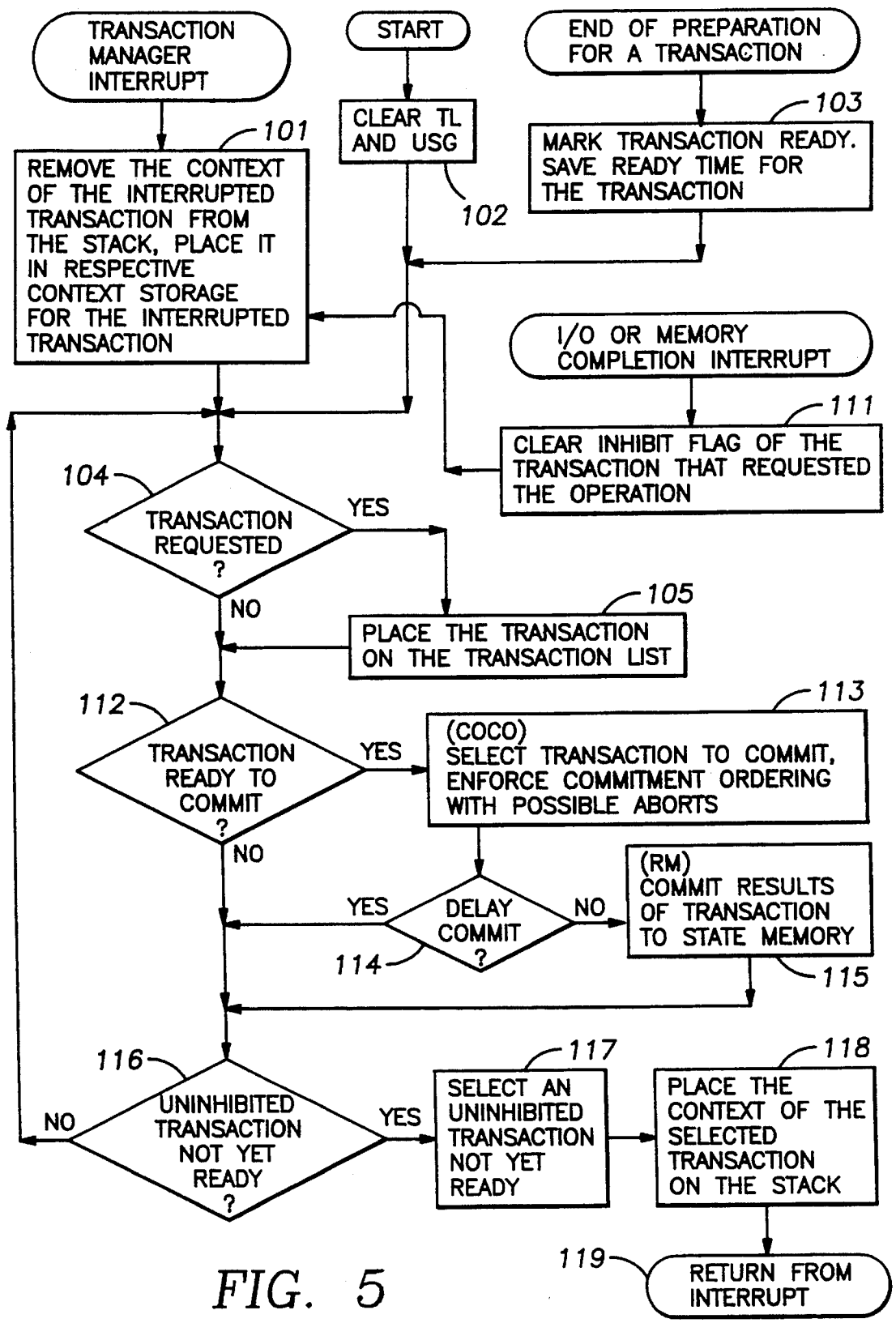
FIG. 5 illustrates a scheduling procedure employed by a transaction scheduler component of the digital computer FIG. 4A.

Turning now to FIG. 5, there is shown a flow chart of a procedure followed by the transaction scheduler for real-time scheduling of component operations of transactions in accordance with available resources of the digital computer. In particular, the transactions include input/output and memory access of rotating memory such as disk drives, and possibly mathematical computations that are performed by a coprocessor. Without real-time scheduling, the central processing unit of the digital computer would have to spend a good deal of time waiting for these operations to be completed before performing the component operations of other transactions.

To more effectively use the resources of the digital computer, a transaction may dispatch input/output and memory access requests to the input/output and memory units of the computer, then set an inhibit flag indicating to the scheduler that the processing of the current transaction should be inhibited until completion of the input/output or memory access operation, and finally execute a software interrupt to the transaction scheduler in order to permit the transaction scheduler to transfer execution to another transaction. When the requested input/output or memory access operation is completed, the input/output or memory device issues a completion interrupt which is handled by a device handler interrupt routine that clears the inhibit flag of the transaction that requested the input/output or memory access operation. It should be noted that input/output and memory access completion interrupts and device handlers for such interrupts are well known in the art.

Referring now particularly to the first step 101 in FIG. 5, the transaction scheduler responds to an interrupt by removing the context of the interrupted transaction from the processor stack of the digital computer, and by placing the context in a respective context storage for the interrupted transaction. The context includes the value of the program counter which points to the interrupted memory location in the transaction program, as well as the context of other general purpose registers in the digital computer.

The transaction scheduler may also be entered during initial start-up of the digital computer in step 102. In step 102, the transaction list 83 and other data structures such as the undecided serializability graph (USG) are cleared and pointers are initialized.

The transaction scheduler may also be entered at the end of preparation for a transaction. In this case, in step 103 the transaction is marked to indicate that it is ready to be committed, and also the current time indicated by the real time clock (25 in FIG. 1) is saved in a memory location allocated to the transaction to indicate the time at which the transaction became ready. It should be noted, however, that some tasks placed on the transaction list might be so-called background tasks of low priority, which are never completed and use central processor execution time remaining after the servicing of all transactions in the list.

The transaction scheduler may also be entered at the end of a device handler interrupt routine. Step 111, for example, clears the inhibit flag (I in the list of FIG. 6) for the transaction having requested the input/output or memory operation, and then execution continues in step 101 to interrupt the current transaction to possibly reschedule execution back to the transaction having requested the input/output or memory operation.

The transaction scheduler performs three major tasks; it responds to transaction requests by placing the transactions on the transaction list; it initiates the committing of ready transactions, and it also schedules the performance of component operations of transactions. In step 104, for example, the transaction scheduler checks whether a transaction has been requested. A transaction scheduler interrupt, for example, may occur in response to an interrupt signal from the input/output unit indicating that a user or another digital computer has requested the performance of a transaction. In this case, in step 105 the transaction request is placed on the transaction list.

Figures 6, 7:
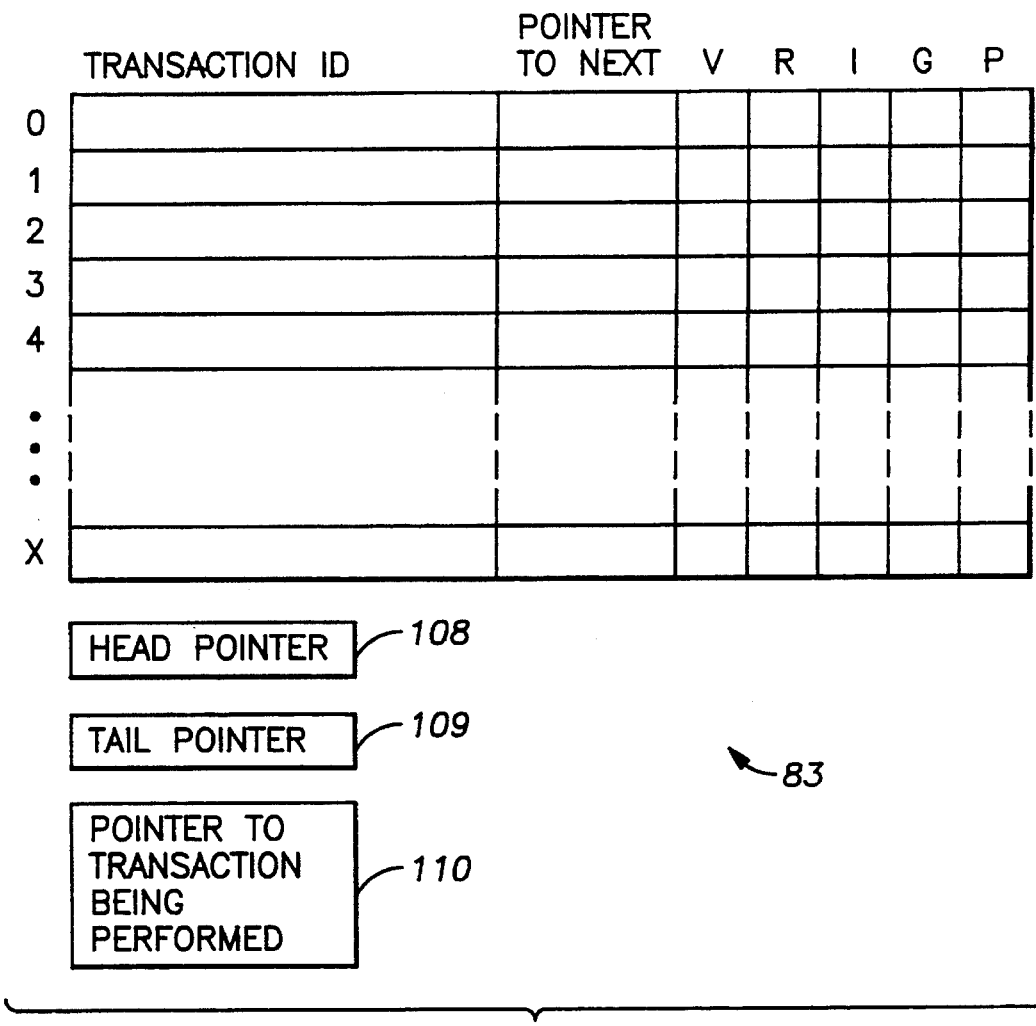
FIG. 6 illustrates an organization of a transaction list and related pointers which are used by the transaction scheduler for scheduling the performance of component operations of distributed transactions.
FIG. 7 is a schematic diagram illustrating a data structure corresponding to a graph of commitment ordering between distributed transactions having conflicting component operations.

Turning for a moment to FIG. 6, there is shown a specific example of the transaction list 83. The transaction list includes a linked list of transaction identification numbers 106. Associated with each transaction identification number is a pointer to the next entry in the linked list, and values for a number of flags (V, R, I, G, P). These flags include a valid flag V indicating whether the entry in the list includes valid data, a flag R indicating whether preparation of the transaction has been completed and the transaction is ready to be committed, a flag I indicating whether preparation of the transaction has been inhibited until completion of an input/output or memory access request, a flag G indicating whether the transaction is a local or global transaction, and a flag P indicating whether the completion of preparation of a global transaction has been reported to a coordinator. The flags G and P associated with global transactions are further described below with reference to FIGS. 14 and 15.

Also associated with the list 83 are a head pointer 108, a tail pointer 109, and a pointer 110 to the transaction being performed. The head pointer 108, for example, has a negative value when the list is empty, and otherwise has a positive value pointing the list entry for the first (highest priority) transaction. In a similar fashion, the tail pointer 109 has a negative value when the list is empty and otherwise has a positive value pointing to the last entry in the list. The pointer 110 to the transaction being performed is used by the transaction scheduler in step 101 of FIG. 5 when responding to an interrupt. In particular the pointer 110 is used to find the respective context storage location for the interrupted transaction when performing step 101.

Returning now to FIG. 5, in step 112 the transaction scheduler checks whether a transaction is ready to be committed. If so, then in step 113 the transaction scheduler invokes the commitment order coordinator (85) to select the transaction to commit, and to enforce commitment ordering with possible aborts and delay. When the commitment order coordinator decides not to delay commitment, then in step 115 the resource manager (RM) commits the results of the transaction to the state memory.

Finally, in step 116, the transaction scheduler checks the transaction list to determine whether there is an uninhibited transaction that is not yet ready. If so, then in step 117, the transaction scheduler selects one of the uninhibited transactions that is not yet ready. To perform 116 and 117, for example, the transaction scheduler first checks whether the transaction list is empty by testing whether the head pointer 108 has a negative value. If the head pointer has a positive value, then the transaction scheduler checks the flags R and I for the transaction at the head of the list to determine whether is not yet ready and is not inhibited. If the first entry is ready or is inhibited, then the transaction scheduler checks the tail pointer 109 to determine whether the end of the list has been reached. If not, then the transaction scheduler checks the pointer to the next entry and performs the same steps until either an uninhibited transaction not yet ready is found or the end of the list has been reached.

When an uninhibited transaction not yet ready has been selected, then in step 118 the context of the selected transaction is placed on the stack. In this regard it should be noted that when a transaction is first placed on the transaction que, then an initial context for the transaction is placed in the respective context storage for the interrupted transaction. The initial context, for example, includes a program counter value pointing to the first instruction in the program for the transaction. After step 118, a return from interrupt is performed in step 119 to begin or continue the execution of instructions in the program for the selected transaction.

Turning now to FIG. 7, there is shown a specific example of a data structure for storing the undecided transactions serializability graph (USG). Whenever a particular order of performing conflicting operations in a respective pair of transactions has been established, that order of performance of the conflicting operation is noted in the undecided transactions serializability graph. If the memory access operations performed by each transaction and the memory locations of those memory accessed operations are known at the time that a transaction is placed on the list, then it is possible in Case 1 of FIG. 3A for the order of performing the conflicting operations to be determined at that time. In this regard, it should be noted that for Case 1 as illustrated in FIG. 3A, write operations are in effect performed at the time of transaction commitment. Aside from this particular case, the order of performance of conflicting operations is determined when a second one of the conflicting operations is scheduled for performance by the transaction scheduler and the memory location accessed by that conflicting operation is determined.

At that time the presence of a conflict is detected, as further described below with reference to FIG. 11, the order of performance is recorded in the undecided transactions serializability graph. The data in the graph of FIG. 7 is presented in pictorial form in FIG. 8. The flags that are set in the data structure of FIG. 7 correspond to edges 131 in the pictorial representation of FIG. 8. The direction of an edge 131 indicates the order of performance of the conflicting operations in the transactions. Once this order of performance is established, it is enforced by aborting transactions or delaying transactions or additional conflicting operations.

Figure 9:
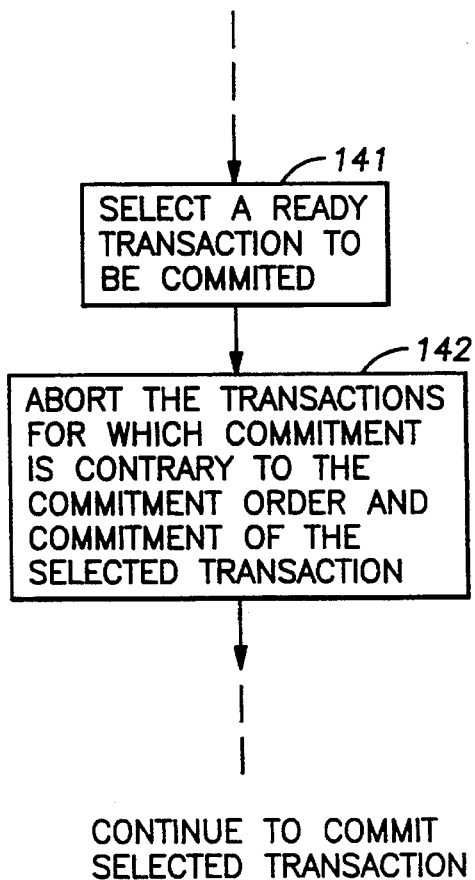
FIG. 9 is a flow chart of a procedure that references the data structure of FIG. 7 to enforce the commitment order.

Enforcement of the commitment order by aborting transactions is illustrated by steps 141 and 142 in FIG. 9. In step 141 a ready transaction to be committed is selected. In situations where there are a number of ready transactions, a particular ready transaction is selected, for example, by selecting the first such transaction in the list, by comparing predetermined priorities associated with the transactions, or in response to the selection from a coordinator. For the list 106 in FIG. 6, for example, global transactions could be given priority over local transactions in the selection process.

In step 142 the commitment order is enforced by aborting the transactions for which commitment is contrary to the commitment order and commitment of the selected transaction. For the commitment order illustrated by the graph in FIG. 8, for example, if the transaction $T_1$ is selected, then transactions $T_0$ and $T_3$ are aborted to enforce the commitment order. Aborting of a transaction involves discarding the results of any transaction. For local transactions, a transaction could be aborted by resetting the contents of its respective context storage to its initial context. In other words, the current value of the program counter for the transaction is reset to the beginning of the program for the transaction. In addition, the transaction list 106 and the undecided transactions serializability graph 84 must be reinitialized. For global transactions, an aborted transaction is restarted if at all by the coordinator. In this case, the transaction is entirely removed from the transaction list.

Figure 10:
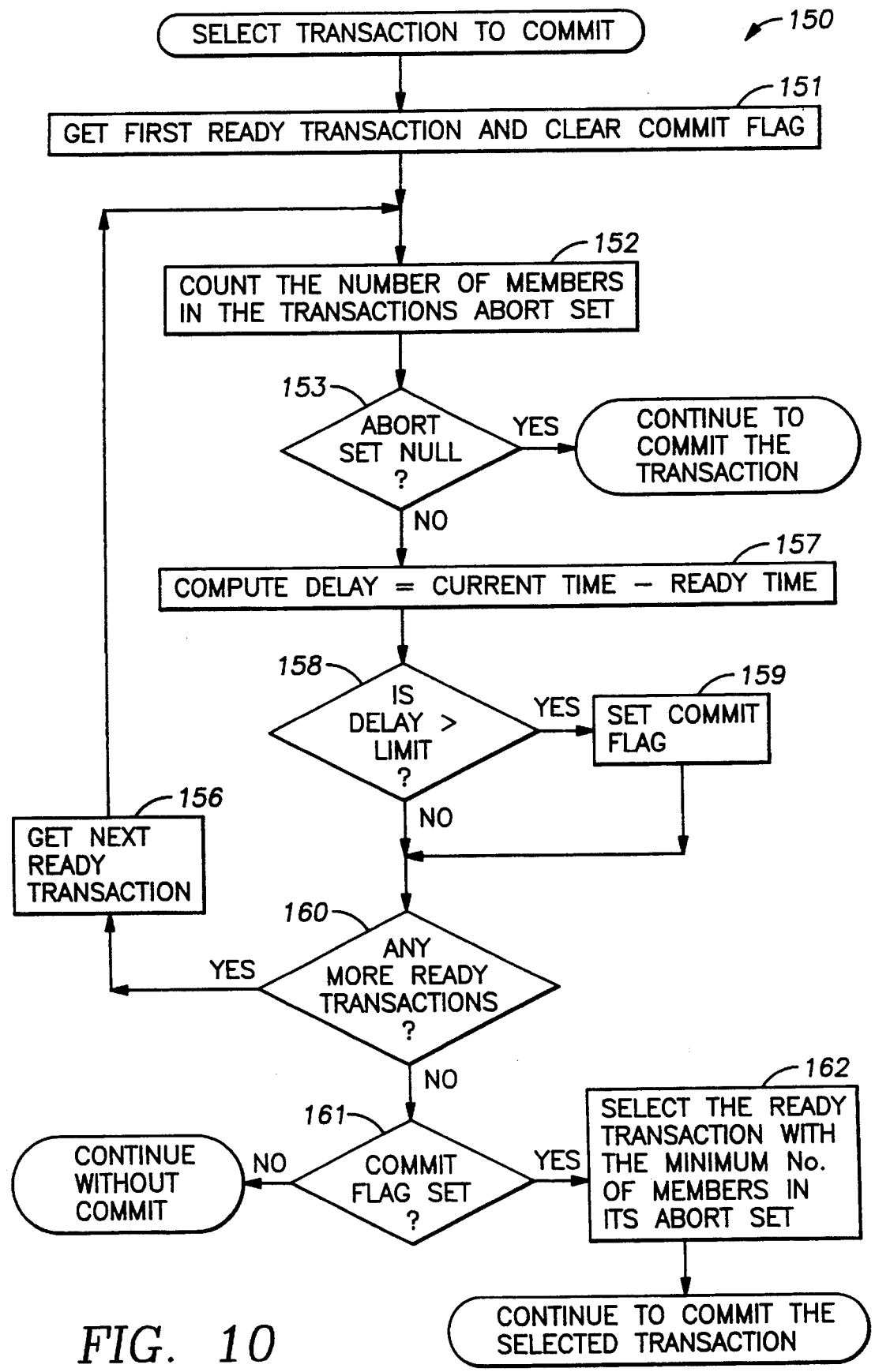
FIG. 10 is a flow chart of a procedure for selecting a transaction to commit.

Turning now to FIG. 10, there is shown a flow chart generally designated 150 of a procedure for selecting a ready transaction to be committed, as introduced above with respect to step 141 of FIG. 9. In the first step 151 of FIG. 10, the transaction list 106 is searched beginning at the head of the list for the first ready transaction. In addition, a "commit flag" used later in FIG. 10 is cleared. Next in step 152 the number of members in the selected transaction's "abort set" is counted. With reference to the undecided transaction serializability graph 84 in FIG. 8, for example, the abort set of each transaction in the graph includes its preceding transactions. In other words, for the transaction $T_1$, its abort set includes transactions $T_0$ and $T_3$, and the number and members in $T_1$'s abort set is two. In a similar fashion, the transactions $T_0$ and $T_4$ have no members in their abort set. With reference to the specific data structure in FIG. 7, the members of a transaction's abort set is determined by the edge flags that are set along a column of the data structure, and the number of members in the abort set is computed by counting the number of flags that are set in the respective column for the transaction. If the selected transaction's abort set is null (has no members), as checked in step 153, then in step 154 execution continues to possibly commit the results of the transaction to state memory, as will be further described below with reference to FIG. 15 for a transaction processing system handling both local and global transactions.

When the abort set of the selected transaction is not null, an attempt is made to delay the committing of the transaction so that the number of members in its abort set may decrease.

In this regard it should be noted that the abort set of a ready transaction can never increase, but it may decrease, since it will decrease by one each time that a member of its abort set is committed. The committing of a selected transaction, however, should not be delayed indefinitely, or otherwise the system may become blocked. Therefore the delaying of a selected transaction will be terminated when the delay exceeds a predetermined delay time. For processing global transactions, it is also desirable to terminate the delay in response to a termination signal from the coordinator, as further described below with reference to FIG. 15. In step 157 of FIG. 10, the delay time is computed as the difference between the current time and the ready time for the transaction (which was saved in step 103 of FIG. 5). When the delay time exceeds a predetermined limit, as checked in step 158, then in step 159 a commit flag is set.

In step 160, when there are additional ready transactions in the transaction list, execution branchs to step 156 to get the next ready transaction, and execution loops back to step 152. Otherwise, in step 161, the commit flag is inspected, and if it is not set then execution continues without a decision having been made to commit any of the ready transactions. Otherwise, in step 162 the ready transaction with the minimum number of members in its abort set is selected.

Figure 11:
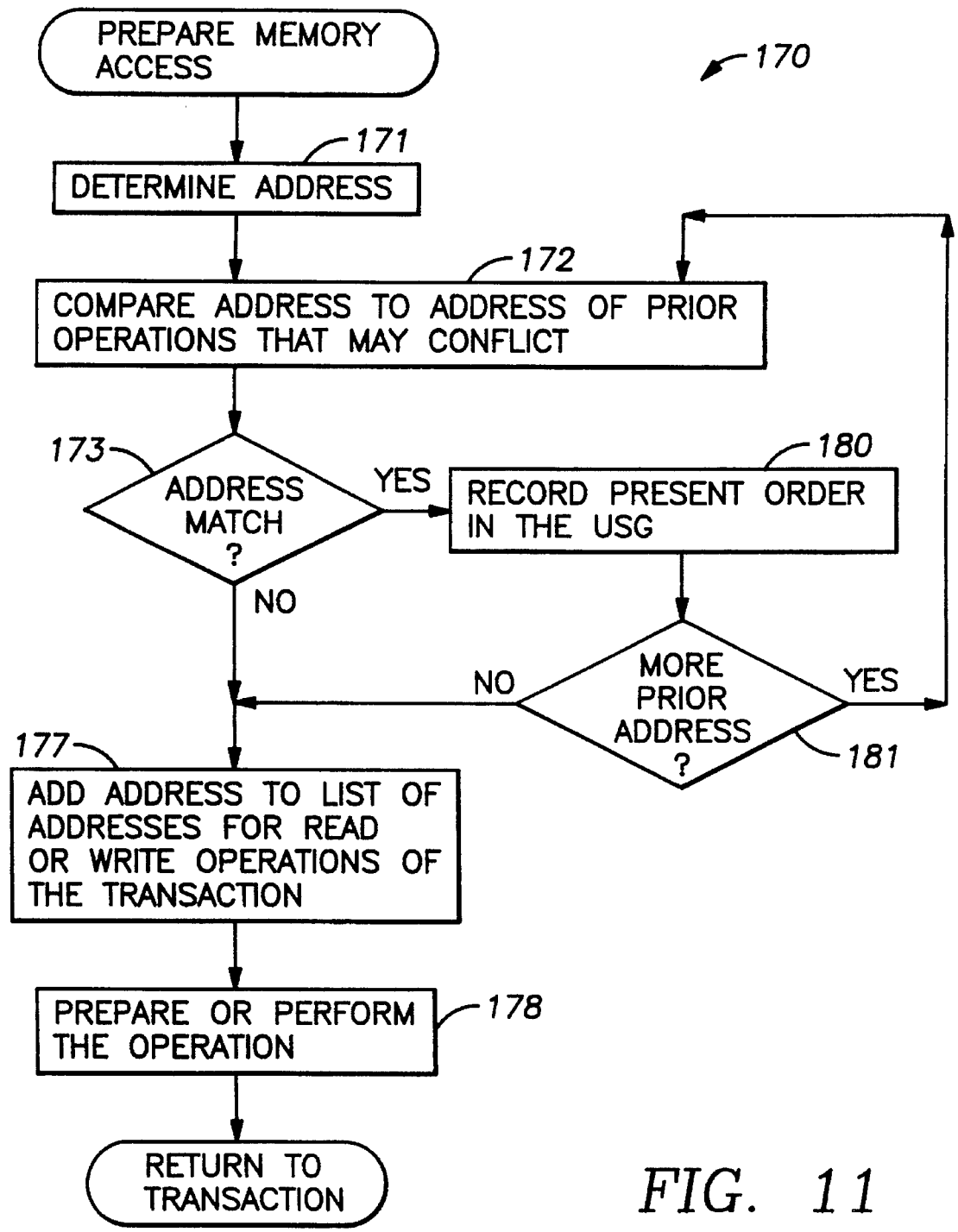
FIG. 11 is a procedure for detecting a conflicting memory access operation during the preparation of a transaction.

Turning now to FIG. 11, there is shown a flow chart 170 of a procedure for determining the commitment order of conflicting component operations of transactions. The procedure 170 is invoked during the preparation of a memory access operation such as a read or write. In the first step 171, the address of the memory access operation is determined. Next, in step 172 the address is compared to addresses of prior operations that may conflict. This is done by searching a list of addresses of prior operations for each transaction in the transaction list. If the present operation is a read operation, then the read operation may conflict with prior write operations. If the present operation is a write operation, then the write operation may conflict with a prior read (or for Case 2 of FIG. 3B, a prior write operation). When there is an address match as tested in step 173, then in step 180 the present order of the transaction is recorded the undecided transactions serializability graph (84 in FIG. 7). In particular, for Case 1 of FIG. 3A, conflicts only occur between a read operation and a write operation, and the order of operation is read then write. For Case 2 of FIG. 3B, the present order must be for the current transaction to be performed after the previous transaction. In step 181 execution branches back to step 172 if there are additional prior memory access operations to check, or otherwise preparation of the memory access continues in step 177 by adding the address determined in step 171 to a list of addresses for read or write operations of the current transaction. Then, in step 178, the operation is prepared or performed. Execution then returns to the transaction.

Figure 12:
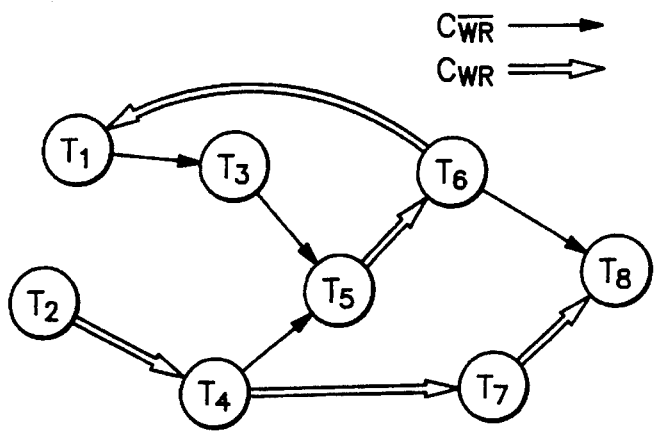
FIG. 12 is a modified graph in which write-read conflicts are distinguished from other conflicts.

Turning now to FIG. 12, there is shown an augmented undecided transaction serializability graph in which edges for write read conflicts are distinguished from edges of other conflicts. Such an augmented graph can be stored in a data structure similar to the data structure shown in FIG. 7, but each edge is represented by a pair of flags, consisting of a first flag indicating any kind of conflict, and a second flag indicating a write-read conflict. The augmented graph of FIG. 12 is used to perform cascading aborts to insure recoverability for a system in which a second transaction can read the write data of a first transaction before the first transaction is committed, as was described above with reference to FIG. 3B. A procedure for performing a cascading abort is shown in the flow chart 190 of FIG. 13. Suppose, for example, that $T_5$ is selected as a ready transaction to be committed. To enforce commitment ordering, then transactions $T_3$ and $T_4$ of FIG. 12 must be aborted. However, assume that the transaction processing system operates in the fashion as described above with reference to FIG. 3B. In this case, when a transaction is aborted to enforce commitment ordering, then every transaction that has read write data of the aborted transaction must also be aborted. From the augmented graph of FIG. 12, it is seen that when the transaction $T_4$ is aborted, then the transaction $T_7$ must also be aborted because of the write read conflict between transactions $T_4$ and $T_7$. Moreover, when the transaction $T_7$ is aborted, then so must the transaction $T_8$ because the transaction $T_8$ has read data written by the transaction $T_7$.

Figure 13:
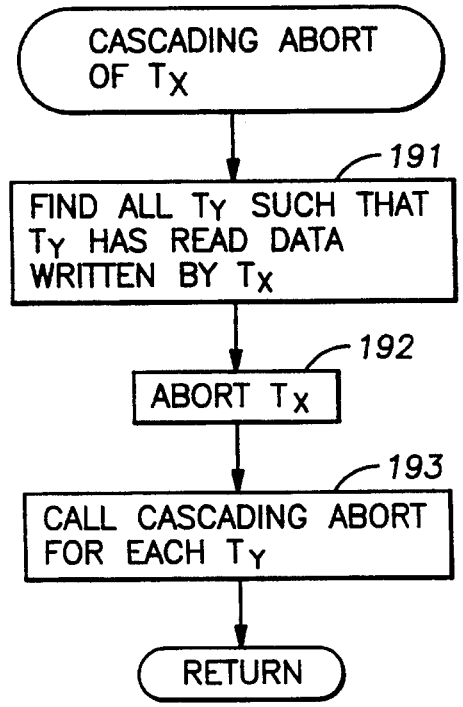
FIG. 13 is a flow chart of a recursive procedure for insuring recoverability by performing cascading aborts.

Returning now to FIG. 13, in the cascading abort procedure 190 for aborting the transaction $T_x$, in the first step 191 the augmented graph is searched to find all of the transactions $T_y$ such that $T_y$ has read data written by $T_x$. Then in step 192 the transaction $T_x$ is aborted. In a final step 193, the subroutine 190 of FIG. 13 is recursively called to abort each of the transactions $T_y$.

Figure 14:
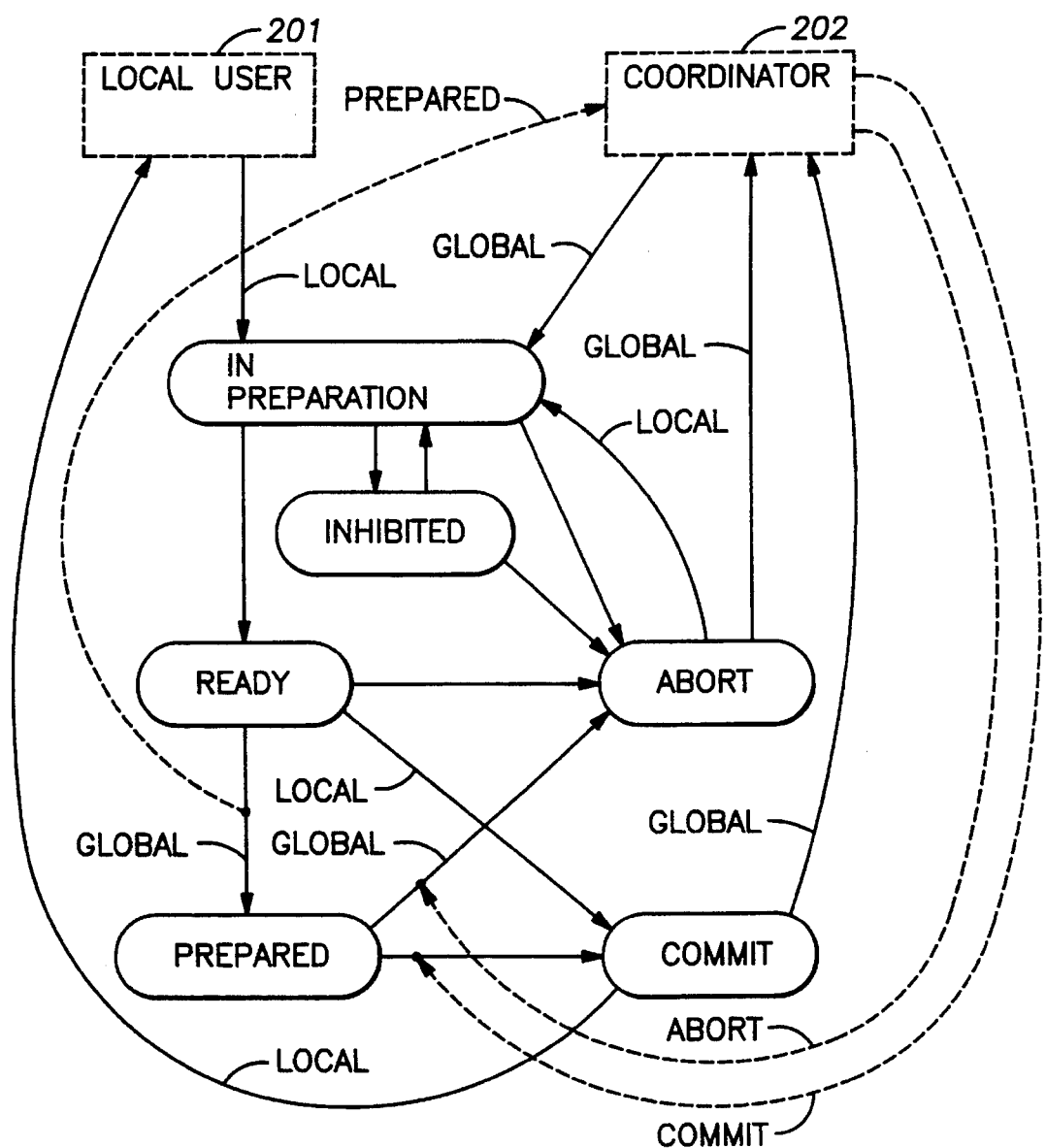
FIG. 14 is a state diagram of the digital computer shown in FIG. 4A when used in a multi-processing system of FIG. 4B for processing both local and global transactions.

Turning now to FIG. 14, there is shown a state diagram of a transaction processing system that processes both local and global transactions. The local transactions, for example, are issued by a local user 201, and the global transactions are issued by a coordinator 202. In each case the transaction scheduler receives the transaction request and puts the transaction request into an entry of the transaction list. At this point, the transaction is said to be in preparation. The transaction scheduler eventually transfers execution to the transaction in preparation, and the transaction is executed until either it becomes inhibited or it becomes ready. As described above in connection with FIG. 5, a transaction may inhibit itself after requesting an input/output or memory operation, and upon completion of the input/output or memory operation, the transaction will become uninhibited. A transaction that is either in preparation, inhibited or ready can be aborted to enforce commitment ordering.

The transaction scheduler may commit a ready local transaction. To insure global synchronization in a distributed transaction processing system, however, a ready global transaction is committed only after a handshake with the coordinator. This handshake insures that a global transaction is not committed unless all of the processors that are processing assigned portions of the transaction are also ready to commit their assigned portions of the global transaction. Therefore, when the transaction scheduler changes the state of a global transaction from the "in preparation" to the "ready" state, the transaction scheduler transmits a "prepared" signal to the coordinator 202.

When the coordinator 202 receives "prepared" signals from all of the transaction schedulers participating in a transaction, then the coordinator sends a "commit" command back to the transaction scheduler. If, however, the coordinator fails to receive a "prepared" signal from all of the participating transaction schedulers, then the coordinator may transmit an "abort" signal to the transaction scheduler. In FIG. 14, these handshake signals are indicated by dotted lines.

When a local transaction is committed, the transaction scheduler removes the transaction from the list and notifies the local user that the transaction has been completed. In a similar fashion, when a global transaction is committed, the transaction scheduler removes the global transaction from the transaction list and sends a signal to the coordinator indicating that the transaction has been committed. Moreover, when a global transaction is aborted, the global transaction is removed from the transaction list and the undecided transaction serializability graph, and the transaction scheduler sends a signal to the coordinator to confirm the abort. For a local transaction, however, it may be desirable to restart preparation of the transaction, and in this case it is only necessary to reset the initial context of the transaction, clear the undecided transactions serializability graph, and set the state of the transaction back to "in preparation" by resetting R and I flags in the list entry of the transaction.

Figure 15:
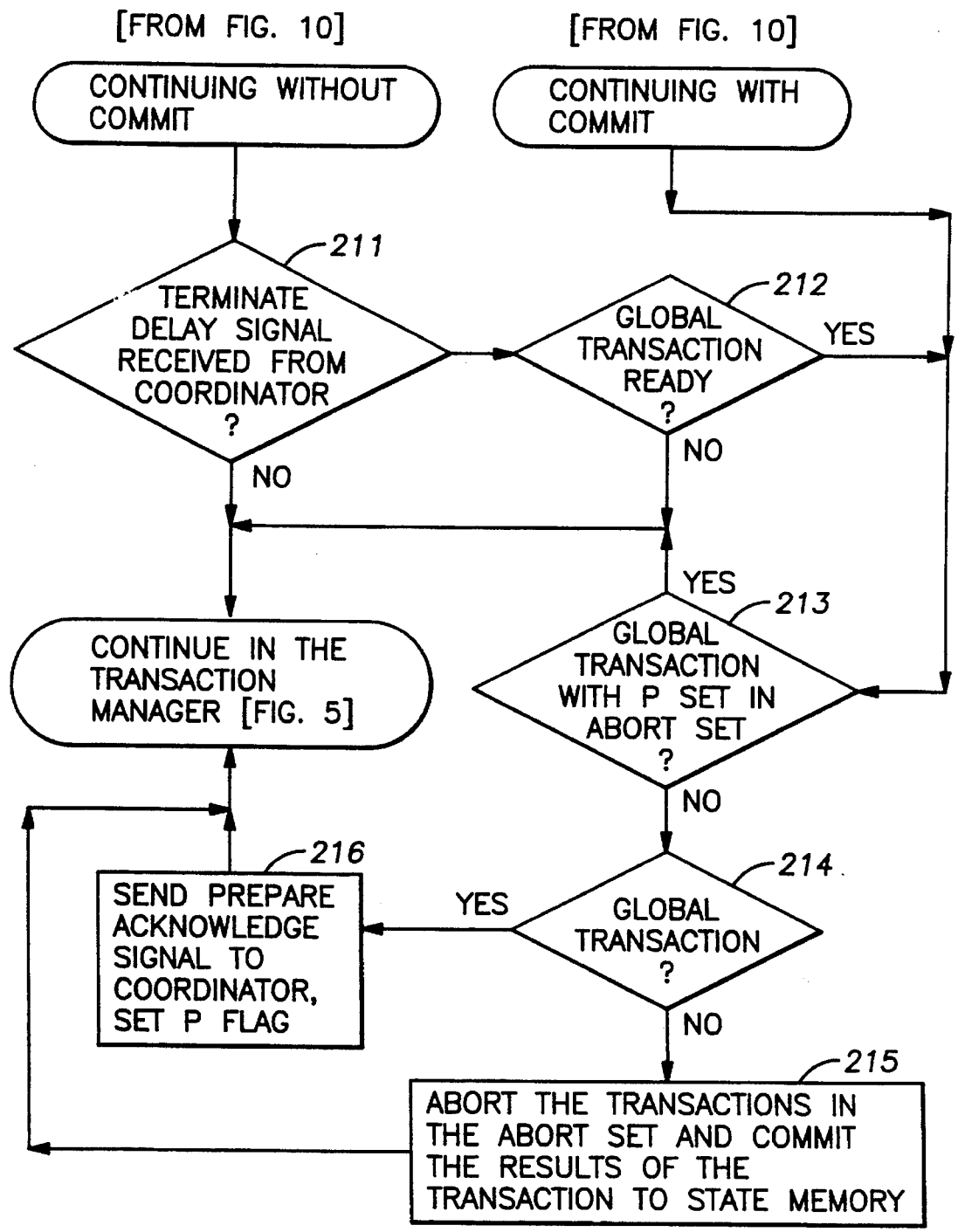
FIG. 15 is a flow chart of commitment scheduling procedures that handle global transactions in a different fashion than local transactions.

Turning now to FIG. 15, there is shown a flow chart of the steps followed by the commitment coordinator for scheduling the commitment of global transactions. The procedure in FIG. 10, for example, may have decided to continue without committing a transaction. In step 211, however, the transaction scheduler may have received a "terminate delay signal" from the coordinator. This may be a distinct signal from the coordinator, or it could be a retransmission of a previously transmitted transaction request. When such a signal is received, then in step 212 the R flag for the transaction in the transaction list is inspected to determine whether the global transaction is ready. If not, then the global transaction cannot be committed. Otherwise, then in step 213 the members of the abort set for the transaction are inspected to determine whether any of the members is a global transaction with the P flag set. Step 213 is also performed with global or local transactions for which the procedure in FIG. 10 selected the transaction to be committed if possible. If the abort set for the transaction selected to be committed includes a global transaction with the P flag set, then the selected transaction cannot be committed before the global transaction with P flag set. Therefore, execution continues in the transaction scheduler. Otherwise, in step 214 execution branches depending upon whether the transaction to be committed is a global transaction. If it is a global transaction, it cannot be committed until after the transaction scheduler sends a prepare acknowledge signal to the coordinator, and receives back a confirming "commit" signal. Therefore, for a global transaction, in step 216 the prepare acknowledge signal ("PREPARED" in FIG. 14) is sent to the coordinator, and the P flag for the global transaction in the transaction list is set, and execution continues in the transaction scheduler. Otherwise, for a local transaction to be committed, in step 215 the transactions in the abort set are aborted (and the "cascading" abort of FIG. 13 is used for Case 2 of FIG. 3A), and the results of the selected local transaction are committed to state memory. Execution then continues in the transaction scheduler.

Figures 16, 17:
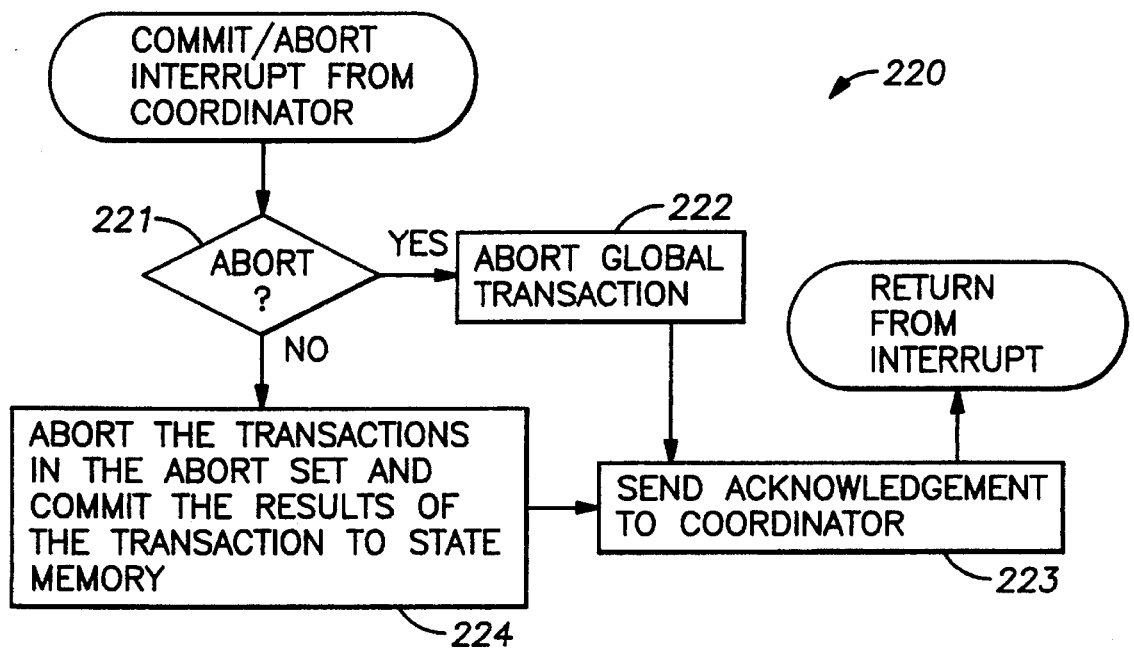
FIG. 16 is a flow chart of a procedure for committing and aborting transactions in response to signals from a coordinator of a global transaction.
FIG. 17 is a block diagram showing a commitment order coordinator employing the present invention inserted in a conventional transaction processing system between a transaction manager and a resource mananger.

Turning now to FIG. 16, there is shown a flow chart 220 for handling prepared global transactions in response to a commit or an abort interrupt from the coordinator. In the first step 221, execution branches depending upon whether the interrupt is for an abort or a commit. In the case of an abort, in step 222 the global transaction is aborted by removing the transaction from the transaction list and clearing corresponding flags in the undecided transactions serializability graph. Finally, in step 223, an acknowledgement of the abort is sent back to the coordinator and then execution returns from the interrupt.

If it was determined in step 221 that the interrupt was for a commit, then in step 224 the transactions in the abort set of the selected global transaction are aborted, and the results of the selected transaction are committed to state memory. Then in step 223 an acknowledgement of the commitment is sent back to the coordinator and execution returns from the interrupt.

Turning now to FIG. 17, there is shown an embodiment of the present invention wherein a commitment order coordinator (COCO) 251 is inserted into a conventional transaction processing system having a transaction manager (TM) 252 and a resorce manager (RM) 253. As shown, the commitment order coordinator 251 assumes a subset of the interface 254 between the transaction manager 252 and the resource manager 253. The commitment order coordinator 251 intercepts a conventional portion 255 of the interface 254, and is interconnected to the resource manager 253 via an extended interface 256 that has some additional signals unique to the operation of the commitment order coordinator. In a distributed processing system, the configuration shown in FIG. 17 may be used at each node in the system.

It is assumed that the resource manager 253 provides the following conventional services:

R_PREPARE(T): The TM notifies the RM to complete the transaction T. It means that the RM will not receive any additional requests or external data on behalf of transaction T;

R_COMMIT(T): The TM notifies the RM to commit transaction T. A prerequisite for invocation of this service is that the RM has previously acknowledged preparation of the transaction (i.e., voted YES); and R_ABORT(T): The TM notifies the RM (and eventually also all the other RMs involved with T) to abort transaction T.

It is also assumed that the transaction manager 252 provides the following conventional services:

T_READY(T): The RM notifies the TM that is has completed processing transaction T, and it votes YES (i.e. it is ready to commit or abort T according to the TM's notification);

T_ABORT(T): The RM notifies the TM that it has aborted transaction T (which will result in aborting T by all the RMs involved).

When inserted into the TM-RM interface 254, the commitment order coordinator 251, rather than the resource manager 253, directly invokes T_READY(T) and T_ABORT(T) services of the transaction manager 252. Moreover, the commitment order coordinator 251, instead of the resource manager directly receives the signals from the transaction manager for causing the R_COMMIT(T) and R_ABORT(T) services. For convenience in identifying the services in the following description, the services of the commitment order coordinator to these signals are named as C_T_COMMIT(T) and C_T_ABORT(T), respectively.

The RM-COCO interface is a superset of the TM-COCO interface. In particular additional services are defined for maintaining the USG, the COCO's data structure. The signals from the RM which previously invoked the conventional T_READY(T) and T_ABORT(T) services of the transaction manager now invoke services C_R_READY(T) and C_R_ABORT(T), respectively, of the commitment order coordinator 251. The commitment order coordinator 251 is also invoked by the resource manager 253 to perform the following additional services of the commitment order coordinator:

C_R_BEGIN(T): The RM notifies the COCO to establish a node for T in the USG; and C_R_CONFLICT($T_1,T_2$): Prior to executing an operation of $T_2$ that generates the conflict with $T_1$, the RM invokes this service to notify the COCO. If a respective edge from $T_1$ to $T_2$ does not exist already in the USG, it is being created. The actual operation of $T_2$ is executed by the RM only after receiving an acknowledgement from the COCO to guarantee that the USG is updated at that time.

The resource manager 253 is invoked by the commitment order coordinator 251 to perform the original R_COMMIT(T) and R_ABORT(T) services. The resource manager 253 is also invoked by the commitment order coordinator 251 to provide the following is additional service: R_CONFLICT_ACK($T_1,T_2$). After this invocation the RM can execute the operation in $T_2$ that causes the respective conflict with $T_1$.

Figure 18:
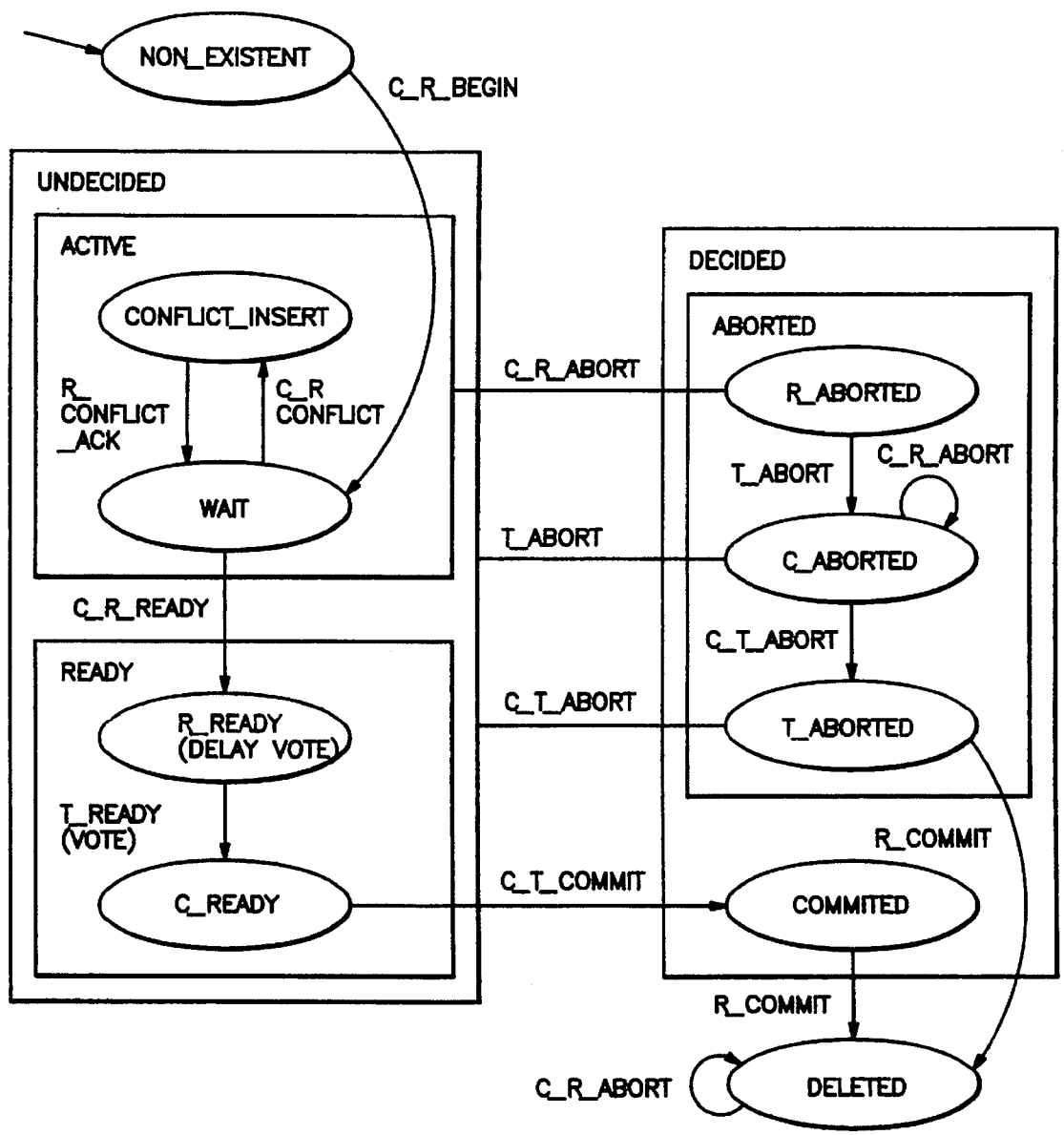
FIG. 18 is a state diagram of the transaction processing system of FIG. 17.

Keeping in mind the above definitions of the invocations in the system of FIG. 17, it should be apparent that states of the system are responsive to the invocations as shown in FIG. 18. The invocations are further defined by the following PASCAL/SQL based pseudo code, which is based on the state diagram of FIG. 18.

In the following pseudo code, concurrent invocations are allowed, as well as several concurrent invocations of the same service. T_ERROR(T) and R_ERROR(T) are error message invocations of the TM, RM respectively, indicating erroneous invocation sequencing. The transaction's atomic state is returned as an error type.

```
C_T_COMMIT(T)
if not C_ready(T)    then T_ERROR(T)
else
begin
        set committed (T)           /* state change */
        for every T' in ABORT(T)
            if not aborted (T') then
                begin
                    T_ABORT(T')         /* abort T" */
                    set C_aborted (T')  /* state change for t" */
                end
        R_COMMIT(T)
        delete T from the USG       /* set deleted (T);
                                       pseudo state change */
end
end_C_T_COMMIT
C_T_ABORT (T)
if not (undecided (T) or C_aborted(T)) then T_ERROR(T)
else
begin      /* set T_aborted(T)      pseudo state change */
        R_ABORT(T)                  /* notify the RM to abort T */
        delete T from the USG       /* set deleted(T);
                                       pseudo state change */
end
end_C_T_ABORT
C_R_BEGIN(T)
if not non_existent(T)
/* i.e. if there is a T node in the USG*/) then R_ERROR(T)
else
begin
        insert a node for T to the USG
        set wait(T)                 /* state change */
end
end_C_R_BEGIN
C_R_READY(T)
if not wait(T) then R_ERROR(T)
else
begin
        set R_ready(T)              /* state change */
        set time(T):=local_time
        /* time(T) is used by the VOTE procedure to timeout
           delaying the voting on T; local_time indicates the local
           clock's value */
end
enc_C_R_READY
C_R_ABORT(T)
if not(active(T) or         /*in a case of invocation collision */
C_aborted(T) or deleted(T)  /* i.e. T does not exist */)
then R_ERROR(T)
else if active(T) then
        being
            /* set T_aborted(T)    pseudo state change*/
            T_ABORT(T)
            set C_aborted(T)        /* state change */
        end
end_C_R_ABORT
C_R_CONFLICT(T',T)
if not wait(T) or deleted (T') then R_ERROR(T)
else
begin
        /* set conflict_insert(T)      pseudo state change */
        if the edge (T',T) does not exist in the USG then
            insert the edge (T',T) to the USG
        R_CONFLICT_ACK(T',T)
        /* set wait(T)                 pseudo change */
end
end_C_R_CONFLICT
VOTE (timeout)
/* timeout: A YES vote may be issued on a ready transaction T
after the time passed since T entered a ready state has exceeded
the timeout value, even if this may cause aborting transactions
in the set ABORT(T). */
repeat
select any transaction T where
            R_ready(T)
        and     (ABORT(T) is empty
                or  decided(T') for every T' in ABORT(T))
    if found then YES(T)        /* voting YES without aborts */
else    begin
            select any transaction T where
                R_ready(T)
                and not C_ready(T') for every transaction T'
                    in ABORT(T)
                /* YES vote on T' has not been invoked */
                and optimal(T)   /*(i.e., T is chosen to
                    minimize the cost of aborting
                    transactions in T' s abort set)*/
                and local_time − time(T) > timeout
                    /* T entered the ready state at time(T);
                    local_time indicates the clock's value */
            if found then YES(T)     /* voting YES with
                                                possible aborts */
        end
end_repeat
YES (T)
                                    /* procedure */
        T_READY(T)                  /* voting YES on T */
        set C_ready(T)              /* state change */
end_YES
end_VOTE
```

The commitment order coordinator 251 as defined by the above pseudo code can be modified to guarantee recoverability of the output schedule. The modified commitment coordinator will be referred to as a CORCO. The CORCO is used when the interfacing RM (253 in FIG. 17) does not guarantee recoverability, and it still follows the state diagram of FIG. 18. The CORCO differs from the above pseudo code example by using cascading aborts, and by the following additional modifications. Write-read conflicts are reflected in the USG's edges, as illustrated in FIG. 12. If the edge ($T_1,T_2$) represents a wr conflict (and possibly some other conflicts) the Boolean wr($T_1$,T) has the value true, and no YES vote is issued on $T_2$ if wr($T_1,T_2$) has the value true (to avoid recoverability violation). Moreover, the service C_R_CONFLICT has an additional Boolean parameter, wr, to indicate a wr conflict (C_R_CONFLICT($T_1,T_2$, wr)). Furthermore, the CORCO's invocations, as well as the its VOTE procedure, are modification of the COCO's, reflecting the differences listed above.

The following recursive procedure CASCADE(T) invokes T_ABORT(T) and generates additional T_ABORT invocations when necessary to maintain recoverability.

```
CASCADE(T)    /* recursive procedure; invokes T_ABORT
for T and all related transactions to be aborted to
```

```
maintain Recoverability (cascading aborts) */
T_ABORT(T)
set C_aborted(T)                    /* state change */
for every T' such that the edge (T,T') is in the USG
        if wr(T,T') then CASCADE(T')
end_CASCADE
C_T_COMMIT(T)
if not C_ready(T) then T_ERROR(T)
else
begin   set committed(T)            /* state change */
        for every T' in ABORT(T)
            if no aborted(T') then CASCADE(T')
        R_COMMIT(T)
        delete T from the USG       /* set deleted(T);
                                       pseudo state change */
end
end_C_T_COMMIT
C_T_ABORT(T)
if not( undecided(T) or C_aborted(T) then T_ERROR(R)
else
begin   /* set T_aborted(T)         pseudo state change */
        for every T' such that the edge (T,T') is in the USG
            if wr(T,T') then CASCADE(T')
        R_ABORT(T)                  /* notify the RM to abort T */
        delete T from the USG       /* set deleted(T);
                                       pseudo state change */
end
enc_C_T_ABORT
C_R_BEGIN(T)        /* unchanged; same as the COCO's */
C_R_READY(T)        /* unchanged; same as the COCO's */
C_R_ABORT (T)
if not( active(T) or       /* in a case of invocation collision */
C_aborted(T) or deleted(T)    /* i.e. T does not exist */ )
then R_ERROR(T)
else if active(T) then
    begin
        /* set T_aborted(T)    pseudo state change */
        CASCADE(T)
    end
end_C_R_ABORT
C_R_CONFLICT(T',T,wr)
if not wait(T) or deleted(T') then R_ERROR(T)
else  begin     /* set conflict_insert(T) pseudo state change */
                if the edge (T',T) does not exist in the USG then
                    begin insert the edge (T',T):= false
                    if wr then set wr(T',T):= true
                    R_CONFLICT_ACK(T'T,wr)
                    /* set wait(T)     pseudo change */
            end
end_C_R_CONFLICT
/* Note: The parameter wr in R_CONFLICT_ACK is
used since the RM does not match a conflict with its ack, and
multiple conflicts between the same two transactions may be
invoked concurrently (one such ack guarantees a proper edge
in the USG; once wr=true, the edge type is set, and remains
unchanged). */
VOTE (timeout)
/* timeout: A YES vote may be issued on a ready transaction T
after the time passed since T entered a ready state has exceeded
the timeout value, even if this may cause aborting transactions
in the set ABORT(T). */
repeat
    select any transaction T where
            R_ready(T)
    and     (ABORT(T) is empty
            or (aborted(T') and not wr(T',T) or committed(T'))
                                for every T' in ABORT(T) )
    if found then YES(T)        /* voting YES without aborts */
    else  begin
            select any transaction T where
                    R_ready(T)
            and
                    (not C_ready(T')
                    /* YES vote on T' has not been invoked */
                    and not wr(T',T) )
                    for every transaction T' in ABORT(T)
            and     optimal(T)
            and     local_time − time(T) > timeout
                    /* T entered the ready state at time(T);
                       local_time indicates the clock's value */
            if found then YES(T)    /* voting YES with
                                            possible aborts */
        end
end_repeat
YES (T)
                                    /* procedure */
        T_READY(T)                  /* voting YES on T */
        set C_ready(T)              /* state change */
end_YES
end_VOTE
```

In view of the above, the component operations of a number of transactions can be distributed and scheduled for execution in a manner most efficient for use of available computing capabilities, yet consistency can be maintained by enforcing a commitment ordering in which transactions are committed in the same order as the order of performance of conflicting operations. In a distributed transaction processing system, conformance to commitment ordering guarantees the serializability of the combined (global) schedule. Moreover, the serializability of the combined (global) schedule is maintained while maintaining the autonomy of each resource manager, and while using a conventional atomic commitment protocol for coordination of global transactions.

APPENDIX I

DEFINITIONS AND PROOFS OF COMMITMENT ORDERING PROPERTIES

The following shows that a history property called "Commitment Ordering" solves the global serializability problem. In particular, global serializability is guaranteed if each resource manager in a distributed transaction processing system follows "commitment ordering," and if the resource managers are "autonomous" (i.e., they coordinate via atomic commitment protocols only, and do not exchange any additional concurrency control information.)

Definitions:

1. A transaction $T_i$ is a partial order of events. The binary, asymmetric, transitive, and irreflexive relation that comprises the partial order is denoted "$<_i$". The subscript i may be omitted when the transaction's identifier is known from the context. Events include read and write operations; $r_i[x]$ denotes that transaction $T_i$ has read data item x, and $w_i[x]$ means that transaction $T_i$ has written data item x. A transaction has also an event of ending a transaction; $e_i$ means that $T_i$ has ended.

Axioms:

2. A transaction $T_i$ has exactly a single event $e_i$. A value is assigned to $e_i$ as follows: $e_i=c$ if and only if the transaction is committed; $e_i=a$ if and only if the transaction is aborted. $e_i$ may be denoted $c_i$ or $a_i$ when $e_i=c$ or $e_i=a$ respectively.

3. For any operation $p_i[x]$ that is either $r_i[x]$ or $w_i[x]$, $p_i[x] <_i e_i$.

Definitions:

4. Two operations on a data item x, $p_i[x]$, $q_j[x]$ are conflicting if either $p_i[x]$ is $w_i[x]$ or $q_j[x]$ is $w_j[x]$.

5. A complete history H over a set T of transactions is a partial order with a relation $<_H$ defined according to the following axioms 6, 7 and 8.

Axioms:

6. If $T_i$ is in T and $event_a <_i event_b$ then $event_a <_H event_b$.

7. If $T_i$ and $T_j$ are in T then for any two conflicting operations $p_i[x]$, $q_j[x]$, either $p_i[x]<_H q_j[x]$ or $q_j[x]<_H p_i[x]$.

8. Let $T_i$, $T_j$ be transactions in T and $q_j[x]$ any operation. If $w_i[x]<_H q_j[x]$ then either $e_i<_H q_j[x]$ or $q_j[x]<_H e_i$. (This axiom provides a unique definition of the history's semantics because if $e_i$=a the effect of $w_i[x]$ is undone; i.e. reading x after $e_i$ results in reading a value of x that existed just before $w_i[x]$.) (Note: The subscript H in $<_H$ may be omitted when H is known from the context.)

Definitions:

9. A history is any prefix of a complete history. A prefix of a partial order P over a set S is a partial order P' over a set S'⊃S, with the following properties:

If b ∈ S' and a $<_P$b then also a ∈ S'

If a,b ∈ S' then a $<_P$b if and only if a $<_P$b

10. A transaction $T_2$ is in conflict with transaction $T_1$ if and only if for respective conflicting operations $q_2[x]$, $p_1[x]$, $p_1[x]<q_2[x]$. (Note that this definition is asymmetric.)

11. If $p_1[x]$ is $w_1[x]$ and $q_2[x]$ is $w_2[x]$ then $T_2$ is in a ww conflict with transaction $T_1$.

12. If $p_1[x]$ is $w_1[x]$ and $q_2[x]$ is $r_2[x]$ then $T_2$ is in a wr conflict with transaction $T_1$.

13. If $p_1$ is $r_1[x]$ and $q_2[x]$ is $w_2[x]$ then $T_2$ is in a rw conflict with transaction $T_1$.

14. There is a conflict equivalence between two histories H and H' (the two are conflict equivalent) if and only if they are both defined over the same set of transactions T, and consist of the same transaction events (for partially executed transactions), and $p_i[x]<_H q_j[x]$ if and only if $p_i[x]<_{H'} q_j[x]$ for any conflicting operations $p_i[x]$, $q_j[x]$ of any committed transaction $T_i$, $T_j$ respectively in T (i.e. H and H' have the same conflicts between operations of committed transactions).

15. A history H over a transaction set T is serial if and only if for every two transaction $T_i$, $T_j$ in T the following is true: If $p_i[x]<_H q_j[y]$ then for any other operations $s_i[u]$, $t_j[v]$ in H $s_i[u]<_H t_j[v]$ (i.e. all the operations of $T_i$ precede all the operations of $T_j$).

16. A history is serializable (SER; is in SER) if and only if it is conflict equivalent to some serial history.

17. A Serializability Graph of a history H, SG(H), is the directed graph SG(H)=(T,C) wherein T is the set of all unaborted (i.e. committed and incomplete) transaction in H, and C (a subset of T×T) is a set of edges that represent transaction conflicts such that for any two transactions $T_1$, $T_2$ in T, there is an edge from $T_1$ to $T_2$ if and only if $T_2$ is in a conflict with $T_1$. The Committed Transactions Serializability Graph of a history H, CSG(H), is the subgraph of SG(H) with all the committed transactions as nodes and with all respective edges. The Undecided Transactions Serializability Graph of a history H, USG(H), is the subgraph of SG(H) with all the uncommitted (i.e., incomplete) transactions as nodes and with all the respective edges.

The Serializability theorem:

18. A history H is serializable is (SER) if and only if CSG(H) is cycle-free.

Definitions:

19. A history H is recoverable (REC; is in REC) if and only if for any two transactions $T_1$, $T_2$ in H, whenever $T_2$ is in a wr conflict with $T_1$, $T_2$ is committed only after $T_1$ has been committed. Formally: ($w_1[x]<r_2[x]$ and $e_2$=c) implies (($e_1<e_2$ and $e_1$=c) or ($e_1<r_2[x]$ and $e_1$=a)).

20. A history H avoids cascading aborts (ACA; is in ACA) if and only if any transaction in H reads data written by committed transactions only. Let $T_1$, $T_2$ be any two transactions in H. The following expression is a formal representation of this concept:

$w_1[x]<r_2[x]$ implies $e_1<r_2[x]$.

21. Let $T_1$, $T_2$ be any two transactions in H. H is strict (ST; is in ST; has the strictness property) if and only if $w_1[x]<p_2[x]$ implies $e_1<p_2[x]$ where $p_2[x]$ is either $r_2[x]$ or $w_2[x]$.

Theorem:

22. REC ⊃ ACA ⊃ ST where ⊃ denotes a strict containment. (This theorem follows immediately from the definitions.)

Definitions:

23. Two Phase Locking (2PL) is a serializability mechanism that implements two types of locks: write locks and read locks. It consists of partitioning a transaction's duration of two phases: In the first locks are acquired; in the second locks are released.

24. A history is in Strong-Strict Two-phase Locking (S-S2PL) if and only if for any conflicting operations $p_1[x]$, $q_2[x]$ of transactions $T_1$, $T_2$ respectively in H $p_1[x]<q_2[x]$ implies $e_1<q_2[x]$. (Note: A history is a two-phase locking if it can be generated by the two-phase locking mechanism. Strict two-phase locking requires that write locks issued on behalf of a transaction are not released until its end; however, read locks can be released earlier, at the end of phase one of the two-phase locking mechanism. Strong-Strict Two-Phase locking requires that all locks are not released before the transaction ends (when it is either committed or aborted.) Strong-Strict Two-Phase locking blocks any conflicting operations on a data item accessed by a transaction until the end of the transaction.)

25. A mechanism is blocking if in some situations it delays events in a transaction until certain events occur in other transactions.

26. A history property is inherently blocking if it can be enforced by blocking mechanisms only.

27. A history property is non inherently blocking if it can be enforced by any non-blocking mechanism. (Note: Both serializability and recoverability are non inherently blocking because they can always be guaranteed by aborting a violating transaction any time before it ends. This observation is the basis for optimistic concurrency control, where transactions run without blocking each other's events, and are aborted only when ended if violating serializability or any other desired property. Two-phase locking and ACA on the other hand are inherently blocking.)

28. A transaction is decided if and only if it is either aborted or committed; otherwise it is undecided.

29. An undecided transaction is ready if and only if it has completed its processing, and is prepared either to be committed or aborted; otherwise it is active.

30. A transaction is undecided if and only if it is either ready or active.

Commitment Ordering Definition:

31. A history has the Commitment Ordering property (i.e., is in CO) if and only if for any conflicting operations $p_1[x]$, $q_2[x]$ of committed transactions $T_1$, $T_2$ respectively, $p_1[x]<q_2[x]$ implies $e_1<e_2$. Formally: ($e_1$=c and $e_2$=c and $p_1[x]<q_2[x]$) implies $e_1<e_2$.

Commitment Ordering Theorem:

32. SER ⊃ CO (i.e., Commitment Ordering Implies Serializability.)

Proof: Let a history H be a CO, and let . . . → $T_i$ → . . . → $T_j$ → . . . be a (directed) path in CSG(H). Using the CO definition and induction θon the order on the path we conclude immediately that $c_i<c_j$. Now suppose that H is not in SER. By there is a cycle $T_1 \to T_2 \to \ldots \to T_n \to T_1$ in CSG(H). First let $T_i$ the Serializability Theorem (1.18) (without loss of generality) and $T_j$ above be $T_1$ and $T_2$ respectively (consider an appropriate prefix of the path above). This implies by the observation above that $c_1<c_2$. Now let $T_i$ and $T_j$ be $T_2$ and $T_1$ respectively (consider an appropriate suffix of the path above). This implies that $c_2<c_1$. However, the two implications contradict since the relation "<" is asymmetric. Hence CSG(H) is acyclic, and H is in SER by the Serializability Theorem. Now examine the following serializable, non CO history to conclude that the containment is strict: $w_1[x]\ w_2[x]\ c_2\ c_1$ Definitions:

33. Timestamp Ordering (TO) concurrency control mechanisms provide serializability and are based on a time-stamp $ts(T_1)$ (a real number) associated with each transaction $T_1$; timestamps are distinct.

Timestamp Ordering Rule:

34. For any two conflicting operations $p_1[x], q_2[x]$ of any committed transactions $T_1, T_2$ respectively, $ts(T_1)<ts(T_2)$ implies $p_1[x]<q_2[x]$. (Note: timestamp ordering is non-blocking (because it can be enforced by aborting either $T_1$ or $T_2$ after all their operations have been issued), and provides the basis for optimistic timestamp ordering based concurrency control, as well as a basis for blocking Timestamp Ordering based mechanisms.

Blocking Timestamp Ordering Rule:

35. For any two conflicting operations $p_1[x], q_2[x]$ of any transactions $T_1, T_2$ respectively, $ts(T_1)<ts(T_2)$ implies $p_1[x]<q_2[x]$. (Note: This Blocking Timestamp Ordering rule requires that conflicting operations are scheduled according to the timestamps order regardless of whether the transaction is committed.)

Timestamp Commitment Ordering Rule:

36. For any two committed transaction $T_1, T_2$ with respective conflicting operations, $ts(T_1)<ts(T_2)$ implies $e_1<e_2$. Formally: ($e_1=c$ and $e_2=c$ and ($p_1[x], q_2[x]$ conflict) and $ts(T_1)<ts(T_2)$) implies $e_1<e_2$.

Theorem:

37. A history has the Commitment Ordering property if and only if it is generated by a mechanism that obeys both the Timestamp Ordering Rule (34) and the timestamp Commitment Ordering Rule (36). (Note: This theorem means that if the Timestamp Commitment Ordering (TCO) rule is being enforced by any Timestamp Ordering mechanism, then only histories having the Commitment Ordering Property are generated. The TCO rule can be easily enforced by delaying commitment events when necessary to comply with the timestamp order.)

Definitions:

38. Transaction Termination Scheduler (TTS) is a component that monitors the set of ready transactions and decides when and which transaction to commit or abort. In a multi-resource manager environment this component participates in atomic commitment procedures on behalf of its resource manager and controls (within the respective resource manager) the execution of the decision reached via atomic commitment for each relevant transaction.

39. A Commitment Ordering Transaction Terminating Scheduler (COTTS) performs the following procedure or its equivalent:

(a) The COTTS maintains a serializability graph, USC, of all undecided transactions. Every new transaction processed by the RM is reflected as a new node in USG; every conflict between transactions in USG if reflected by a directed edge (an edge between two transactions may represent several conflicts though). USG(H)=(UT, C) where UT is the set of all undecided transactions in a history H; and C (a subset of UT×UT) is the set of directed edges between transactions in UT. There is an edge from $T_1$ to $T_2$ if and only if $T_2$ is in a conflict with $T_1$. The USG reflects all operation's conflicts until commit. The set of transactions aborted as a result of committing T (to prevent future commitment-ordering violation) is defined as follows:

$ABORT_{CO}(T)=\{T'|T'\rightarrow T$ is in C$\}$

The COTTS iteratively performs the following steps:

(a) selects any ready transaction (i.e. that has completed processing) T in USG (using any criteria, possibly by priorities assigned to each transaction; a priority can be changed dynamically as long as the transaction is in USG), and commit it;

(b) aborts all the transactions in the set $ABORT_{CO}(T)$, i.e. all the transactions (both ready and active) in USG that have an edge going to T; and (c) removes any decided transaction (T and the aborted transactions) from the graph (they do not belong in USG by definition).

Theorem:

40. The Commitment Ordering Transaction Termination Scheduler (COTTS) produces histories having the Commitment Ordering (CO) Property.

Proof: The proof is by induction on the number of iterations by the COTTS, starting from an empty history $H_0$, and an empty graph $USG_0=USG(H_0)$. $H_0$ is CO. Assume that the history $H_n$, generated after iteration nb, is CO. $USG_n$ (in its UT component) includes all the undecided transactions in $H_n$. Now perform an additional iteration, number n+1, and commit transaction $T_1$ (without loss of generality—wlg) in $USG_n$. $H_{n+1}$ includes all the transactions in $H_n$ and the new (undecided) transactions that have been generated after completing step n (and are in $USG_{n+1}$). Examine the following cases after completing iteration n+1:

(a) Let $T_2, T_3$ (wlg) be two committed transactions in $H_n$. If $T_3$ is in conflict with $T_2$ then $c_2<c_3$ since $H_n$ is CO by the induction hypothesis.

(b) $c_2<c_1$ for every (previously) committed transaction $T_2$ in $H_n$ with which $T_1$ is in a conflict.

The cases above exhaust all possible pairs of conflicting committed transactions in Hn1. Hence Hn+1 is CO. (Note: If there exists a transaction that does not reside on any cycle in USG then there exists a transaction T with no edges from any other transaction. T can be committed without aborting any other transaction since $ABORT_{CO}(T)$ is empty. If all the transactions in USG are on cycles, at least one transaction has to be aborted. This situation seems to be uncommon. In a multi RM environment, if the RM (TTS) does not choose by itself the transaction to be committed, but rather receives a request (via an atomic commitment protocol) to commit some transaction T in USG, all transactions in $ABORT_{CO}(T)$, i.e. with edges to T, need to be aborted when T is committed (by the COTTS). The TTS may choose to commit T immediately (the non-blocking without delays approach). Another approach (non-blocking with delays) is to delay the commitment for a given amount of time. During the delay the set $ABORT_{CO}(T)$ may become smaller or empty. If T is in a ready state the set cannot increase. Instead of immediately committing, or delaying the commitment for a given amount of time (which may results in aborts) the TTS can block the commitment of T until all transactions in $ABORT_{CO}(T)$ are decided. However, if another RM in the environment also blocks, this may result in a global deadlock.)

Definition:

41. A CORTTS is a COTTS which generates histories that are both CO and recoverable. The CORTTS maintains an enhanced serializability graph, wr-USG:

wr-USG(H)=(UT,C,$C_{wr}$) where

UT is the set of all undecided transactions in the history H; and C is the set of edges between transactions in UT. There is a C edge from $T_1$ to $T_2$ if and only if T is only in non wr conflicts with $T_1$. $C_{wr}$ is the set of edges between transactions in UT with wr conflicts as well. There is a C wr edge from $T_1$ to $T_2$ if and only if $T_2$ is in a wr conflict with $T_1$ (and possibly also in conflicts of other types). C and C wr are disjoint. The set of transactions aborted as a result of committing T (to prevent future commitment-ordering violation) is defined as follows:

$ABORT_{CO}$(T)={T'|T'→T is in C or $C_{wr}$}

The definition of $ABORT_{CO}$ (T) here has the same semantics as of the respective set for COTTS. The set of aborted transactions due to recoverability, as a result of aborting transaction T', is defined as follows:

$ABORT_{REC}$(T')={T"|T'→T" is in $C_{wr}$ or T"'→t" is in C wr where T"' is in $ABORT_{REC}$(T;)} Note that the definition is recursive. This well reflects the nature of cascading aborts. The CORTTS iterates the following steps: (a) select any ready transaction T in wr-USG, that does not have any in-coming $C_{wr}$ edge (i.e. such that T is not in $ABORT_{REC}$(T') for any transaction T' in $ABORT_{CO}$(T); this to avoid a need to later abort T itself), and commit it; (b) abort all the transaction T' (both ready and active) in $ABORT_{CO}$(T); (c) abort all the transaction T" (both ready and active) in $ABORT_{REC}$(T') for every T' aborted in the previous step (cascading aborts); and (d) remove any decided transaction (T and all the aborted transactions) from the graph. (Note: during each iteration wr-USG should reflect all operation's conflicts till commit.)

Theorem

42. The CORTTS produces CO, recoverable histories

Proof: The histories generated are CO by theorem 40 since CORTTS differs from COTTS only in aborting additional transactions during each iteration (due to the recoverability requirement). Since all the transactions that can violate recoverability (transactions in $ABORT_{REC}$(T') for every aborted transaction T' in $ABORT_{CO}$(T) are aborted during each iteration (i.e. transactions that read data written by an aborted transaction before the abort), the generated histories are recoverable. (Note: The CORTTS can be implemented as a non-blocking without delays, with delays and blocking TTS with results similar to those discussed above in the notes about the COTTS.)

Corollaries:

43. A COTTS generates histories that are serializable.

44. A CORTTS generates histories that are both serializable and recoverable 45. Non-blocking schedulers based on COTTS and CORTTS generate deadlock free executions only. (Note: The TTSs above can be combined with any resource access schedules (RAS) for scheduling resource access operations. If both the TTS and the RAS are non-blocking, then also the combined mechanism is non-blocking, and hence ensures deadlock-freeness. A combination of a RAS and a TTS can replace a RAS above, if some filtering (by a TTS) is required to impose further history properties. In this case the filtering TTS may only abort transaction. But it does not matter if the RAS produces serializable histories since the CO TTSs above guarantee serializability. The combined mechanism may execute as follows: First, the transactions are controlled by the RAS (or a RAS with a TTS). The unaborted, ready transactions are considered by the COTTS as candidates to be committed, and transactions are aborted if violating the CO TTS's conditions. Note that if the scheduler above is S-S2PL based, then the USG of the respective CO TTS does not have any edges. This means that no aborts by the CO TTS are needed, as one can expect, and a CO TTS is unnecessary. This is an extreme case. Other scheduler types can induce other properties of the respective USGs to impose desired schedule patterns and system behaviors, according to the nature of the transactions involved. Note also that if the combined CC mechanism guarantees the Recoverability property, the COTTS is sufficient (no need for CORTTS because recoverability is inherited). When the scheduler if Timestamp Ordering (TO) based and CO is desired, an advantage can be taken of existing data structures, rather than implementing the USG independently. In this case CO is imposed by enforcing the Timestamp Commitment Ordering rule.

Definitions:

46. An environment comprises a distributed services system having a plurality of Resource Managers (RMs), where a transaction can span any subset of participating RMs. Each RM in an environment has an identifier (e.g. RM 2). Events are qualified by both a transaction's identifier and an RM's identifier (e.g. $w_{3,2}$[x] means a write operation of data item x by RM 2 on behalf of transaction $T_3$).

Axiom:

47. If $P_{i,j}$[x], $q_{k,l}$[Y], j≠l are operations (by RMs j, l respectively), then x≠y; i.e. these operations cannot conflict.

Definitions:

48. A global transaction $T_i$ consists of one or more local subtransactions. A local subtransaction $T_{i,j}$, accesses all the data under the control of RM j that $T_i$ needs to access, and only these data items (i.e. all its events are qualified with j). A local subtransaction obeys the definition of a transaction. A local subtransaction has the states of a transaction.

49. A local history is generated by a single RM, and defined over the set of its local subtransactions. A local history obeys the definition of a history in section 2. $H_i$ is the history generated by RM i with a relation$<_{Hi}$. (Note: It is assumed that an atomic commitment (AC) protocol is applied to guarantee atomicity in the distributed environment.)

50. An AC protocol implements the following general scheme each time a transaction is decided: Each participating RM votes either "Yes" or "No" (but not both) after the respective local subtransaction has reached the "ready" state, or votes "No" if unable to reach the "ready" state. The transaction is committed by all RMs if and only if all have voted "Yes". Otherwise it is aborted by all the RMs. (Notes: 2PC is a special case of AC. Failure and recovery issues are not dealt with here.) The fact that AC is used allows one to assume that a distributed transaction has a single commit event (though in reality this is not always guaranteed). However, this is not true for aborts.

Example: The following two transactions both access data items x and y. x, y are under the control of RMs 1, 2 respectively. $T_1$ and $T_2$ and their local transactions are the following:

RM 1 $T_{1,1}$: $r_{1,1}$[x] $c_1$ $T_{2,1}$: $w_{2,1}$[x] $c_2$

RM 2 $T_{1,2}$: $r_{1,2}$[y] $c_1$ $T_{2,2}$: $w_{2,2}$[y] $c_2$ $T_1 T_2$

The RMs generate the following (local) histories $H_1$ and $H_2$:

RM 1: $H_1$ $r_{1,1}[x]$ $w_{2,1}[x]$ $c_2$ $c_1$

RM 2: $H_2$ $w_{2,2}[y]$ $c_2$ $r_{1,2}[y]$ $c_1$

Note that the history $H_1$ violates commitment-ordering which results in a (global) serializability violation. The respective global history H is described by the following order relationships:

$$r_{1,1}[x] < w_{2,1}[x] < c_2 < r_{1,2}[y] < c_1$$

$$w_{2,2}[y] < c_2$$

51. For any history property X a (global) history H is in Local-X (is locally X) if and only if for every RM i in the environment $H_i$ (the history of RM i) is in X (is X).

Theorem:

52. A history is in X (is globally X) if and only if it is in Local-X (i.e. Local-X=X), where X is any of the following property: REC, ACA, ST, CO, S-S2PL.

Proof: Follows from the definition of Local-X, Axiom 47, and the definitions of REC, ACA ST, CO and S-S2PL.

Theorem:

53. Being in Local-X does not imply that a history is in X (i.e. Local-X ⊃ X), where X is any of the following properties: SER, 2PL, S2PL Proof: Let H be the history as in the example above. The history H is in Local-SER, Local-2PL and Local-S2PL since both $H_1$ and $H_2$ are in SER, 2PL and S2PL. However H is not in SER, 2PL or S2PL. CSC(H) has a cycle, so by the H is not in SER. If it is in 2PL it is also in SER, and we have a contradiction.

Theorem:

54. SER ⊃ Local-CO. In other words if a history is in Local-CO then it is globally serializable. This theorem follows from the Commitment Ordering theorem and theorem 52.

(Note: Local-CO can be maintained by RMs using any types of CO mechanisms.)

Definition:

55. A permanent risk (PR) transaction is a transaction that can cause a potential serializability violation when committed, and will stay in this situation forever. The PR property is relative to the resource manager. The above requirement implies that each RM in the environment should implement the following Commitment Strategy (CS): Starting from a history with no decided transactions any ready transaction is committed (usually the RM is requested via an AC protocol to commit some transaction). Every other transaction that is a PR is aborted. (hidden axiom is assumed here, that resources are not held unnecessarily. Otherwise PR transactions can be marked and kept undecided for ever.) Then another (any) ready transaction, that cannot cause a serializability violation, is committed. Again all the PR transactions are aborted, and so forth.

Theorem:

56. If only local serializability information is available for each RM in the environment, and if atomic commitment is applied, then CS is a necessary strategy for each RM, in order to guarantee global serializability. CS produces locally CO histories (global histories in Local-CO).

Proof: The Serializability Theorem implies that the serializability graph provides all the necessary information about serializability. We assume that every RM, say RM i, "knows" its local serializability graph $SG_i$ (it includes all the committed and undecided transactions only) and its subgraphs $CSG_i$ (includes committed transactions only) and $USG_i$ (includes all undecided transactions). We also assume (based on AC) that each RM has committed a transaction, if and only if it has voted "Yes", and "knows" that all other RMs participating in a transaction have voted "Yes", and will eventually commit it. The goal for each RM is to guarantee a cycle-free (global) CSG (committed transaction serializability graph), by avoiding any action that may create a global cycle (local cycles in $CSG_i$ are eliminated by RM i). First, CS is trivially necessary for the following reasons: Since a PR transaction remains PR for ever (by definition), it cannot be committed and must be aborted to free resources. On the other hand, any ready transaction that cannot cause a serializability violation can be committed. We now need to identify permanent risk (PR) transactions, while implementing CS. We show that this implies that each RM operates as a COTTS. Each RM implements CS as follows:

(a) Base stage: Assume that $CSG_i$ does not include any transaction. Commit any ready transaction T. Suppose that prior to committing T there is an edge T'→T in $USG_i$. It is possible that there is an edge T→T' in some $USG_j$ of some RM j, j≠i, but RM i, though, cannot verify this. This means that committing T' later may cause a cycle in CSG. Since committing T cannot be reversed (see transaction state transitions in section 3), no event can change this situation. Hence T' is a PR, and RM i must abort it.

(b) Inductive stage: Suppose that $CSG_i$ includes one transaction at least. We show that no ready transaction can cause a serializability violation if committed, and hence can be committed (provided that a consensus to commit is reached by all the participating RMs via AC): Commit any ready transaction T. Examine any previously committed transaction T". It is impossible to have a path T → ... → T" in $CSG_i$ or in $CSG_j$ for any RM j, j≠i since if this path existed at the stage when T" was committed, it would have been disconnected during that stage, when aborting all transactions with edges to T" (using the arguments given for the base stage above), and since no incoming edges to T" could have been generated after T" has been committed. Hence, only a path T" → ... → T can exist in $CSG_i$ or in $CSG_j$ for any RM j, j≠i. This means that no cycle in CSG through T and T" can be created, and no T" needs to be aborted (which would fail the strategy). Examine now any undecided transaction T' (in $USG_i$.) Suppose that prior to committing T there is an edge T' → T in $USG_i$. Using again the arguments given for the base stage, T' is a PR, and RM i must abort it (by voting "No" via AC). If there is no edge from T' to T, no decision concerning T' is taken at this stage.

The arguments above ensure that no ready transaction can cause a serializability violation when committed at the beginning of an inductive stage, as was assumed, and hence (any ready transaction) T could have been committed.

In the CS implementation above all the PR transactions are identified and aborted at each stage. Examining this implementation we conclude that it functions as a COTTS. Hence, by theorem 40 every RM involved produces a CO history, and the generated (global) history is locally CO (in Local-CO). The only possible deviation from the implementation above is by aborting additional transactions at each stage. Such a deviation still maintains the generated history in Local-CO.

Corollary

57. If RMs coordinate concurrency control via atomic commitment only, then local commitment-ordering is a necessary and sufficient condition for (global) serializability. This corollary follows from theorems 52, 55 and 56.

Corollary

58. If RMs coordinate concurrency control via atomic commitment only, then local commitment-ordering and local recoverability are a necessary and sufficient condition for (global) serializability and recoverability. This corollary follows from Theorem 52.

59. A global deadlock is a deadlock caused by a mutual blocking of two or more local subtransactions in two different transactions at least, by two different RMs at least. (Notes: Since commitment-ordering is not inherently blocking, it can be implemented in a non blocking manner, for example, by aborts or by aborts after delays. If the schedulers of all the RMs in the environment are non-blocking (with the exception of one that can be blocking), the executions are deadlock-free.

Another way to implement commitment-ordering is by using blocking CO certifiers (CO schedulers with a non-blocking RAS and a blocking TTS). If the schedulers for all RMs are certifiers, when two at least are blocking, the global deadlocks can occur (even if each RM resolves its own deadlocks). In this case all the transactions involved with a deadlock are in a ready state. This fact allows to resolve deadlocks during atomic commitment.

If schedulers of two or more RMs are blocking, where one, at least, has a blocking RAS (e.g. S-S2PL. or CO, BTO based), then also active transactions can be involved with a global deadlock. In this case atomic commitment messages are not sufficient for deadlock resolution, and additional messages signaling the presence of blocks (possibly piggybacked on AC messages of other transactions) are required).

Conclusion

Commitment-ordering provides a way to achieve global serializability, also through deadlock free mechanisms. This allows a trade off between blocking techniques, that are subject to deadlocks, and non-blocking implementations, that are deadlock free but subject to cascading aborts. In order to guarantee serializability no services, but those of atomic commitment, are necessary for the coordination of transaction management across RMs, if each RM supports commitment-ordering. However, commitment-ordering is necessary for global serializability if only atomic commitment is used for RM coordination.

What is claimed is:

1. A computer-implemented method of processing transactions in a computing system, said method comprising the steps of:

a) beginning preparation of results of said transactions;

b) checking for memory access conflicts between said transactions, not all of said transactions having memory access conflicts, and when said checking for memory access conflicts finds that one of said transactions has a first operation that conflicts with a second operation in another one of said transactions, recording in memory of said computing system an order of performance for the transactions having the first conflicting operation and the second conflicting operation;

c) after results of said transactions having the first conflicting operation and the second conflicting operation have been prepared so that each one of said transactions having the first conflicting operation and the second conflicting operation is ready to be committed, selecting one of said transactions having the first conflicting operation and the second conflicting operation to be committed and thereby identifying a selected transaction, and determining an abort set of transactions for which commitment after commitment of said selected transaction would be contrary to said order of performance having been recorded in said memory of said computing system such that said abort set includes all transactions not yet committed nor aborted that have a performed operation conflicting with a later performed operation in said selected transaction, and in response to the selecting of said selected transaction:

(i) committing to memory state of said computing system the prepared results of said selected transaction; and (ii) aborting all transactions in said abort set, wherein said abort set includes at least one transaction having results prepared and being ready to be committed and having a performed operation conflicting with a later performed operation in said selected transaction.

2. The method as claimed in claim 1, wherein said step of committing to memory state includes updating a data base file.

3. The method as claimed in claim 1, wherein said step of committing to memory state includes changing memory state of a data object.

4. The method as claimed in claim 1, wherein the transactions that are ready to be committed have predetermined priorities, one of the transactions that are ready to be committed has a highest one of the predetermined priorities, and the step of selecting said selected transaction includes comparing the predetermined priorities of the transactions that are ready to be committed and selecting the transaction having the highest one of the predetermined priorities among the transactions that are ready to be committed so that said selected transaction has the highest one of said predetermined priorities among the transactions that are ready to be committed.

5. The method as claimed in claim 1, wherein the step of selecting said selected transaction is based on ordering of said transactions in a list so that said selected transaction is a first transaction in said list among transactions in said list that are ready to be committed.

6. The method as claimed in claim 1, wherein the step of selecting said selected transaction is performed in response to a commit command from a coordinator.

7. The method as claimed in claim 1, wherein each of said transactions having said first conflicting operation and said second conflicting operation has an abort set of transactions for which commitment after commitment of said each of said transactions having said first conflicting operation and said second conflicting operation would be contrary to said order of performance, the abort set for one of said transactions having said first conflicting operation and said second conflicting operation having fewer members than the abort set for the other of said transactions having said first conflicting operation and said second conflicting operation, and wherein the step of selecting said selected transaction includes accessing said order of performance in said memory, and from said order of performance in said memory, determining which abort set of said transactions having said first conflicting operation and said second conflicting operation has fewer members, and selecting to be committed the one of said transactions having the abort set having fewer members, in order to minimize the number of transactions that are aborted in said step (ii).

8. The method as claimed in claim 1, which includes receiving from a coordinator a request specifying a transaction to be prepared and thereby identifying a specified transaction, and wherein preparation of results for said specified transaction is begun in said step (a) in response to receiving from said coordinator the request to prepare said specified transaction, and wherein the method further includes the step of delaying acknowledgement to said coordinator of completion of preparation of said specified transaction until none of the transactions not yet committed nor aborted have a performed operation conflicting with a later performed operation in said specified transaction.

9. The method as claimed in claim 8, further comprising the step of terminating said delaying when said delaying persists for a predetermined duration of time.

10. The method as claimed in claim 8, further comprising the step of terminating said delaying upon receipt of a termination signal from a coordinator.

11. The method as claimed in claim 1, wherein said checking for memory access conflicts between transactions is performed during the preparation of results for transactions having conflicting operations.

12. The method as claimed in claim 1, wherein said checking for memory access conflicts between transactions is performed after computing an address of a memory access operation.

13. The method as claimed in claim 1, wherein said checking for memory access conflicts between transactions includes comparing an address of a memory access operation for one transaction to addresses of memory access operations for other transactions.

14. The method as claimed in claim 1, wherein a read operation of a second one of said transactions reads write data written by a write operation of a first one of said transactions before said first one of said transactions is committed, and wherein said method further comprises the step of aborting all of said transactions that have read data written by aborted transactions.

15. A computer-implemented method of processing transactions in a computing system, said method comprising the steps of:

a) receiving requests for processing said transactions;

b) beginning preparation of results of said transactions;

c) checking for memory access conflicts between said transactions, not all of said transactions having memory access conflicts, and when said checking for memory access conflicts finds that one of said transactions has a first operation that conflicts with a second operation in another one of said transactions, storing in memory of said computing system data indicating an order of performance for the transactions having the first conflicting operation and the second conflicting operation, said checking for memory access conflicts between transactions being performed during the preparation of results for transactions having conflicting operations;

d) after results of said transactions having the first conflicting operation and the second conflicting operation have been prepared so that each one of said transactions having the first conflicting operation and the second conflicting operation is ready to be committed, selecting one of said transactions having the first conflicting operation and the second conflicting operation to be committed and thereby identifying a selected transaction, and in response to the selecting of said selected transaction:

(i) committing to memory state of said computing system the prepared results of said selected transaction; and (ii) for each transaction, other than said selected transaction, for which preparation of results has begun and which has not yet been committed nor aborted, inspecting said data stored in memory to determine whether commitment of said each transaction after commitment of said selected transaction would be contrary to said order of performance such that said each transaction has a performed operation conflicting with a later performed operation in said selected transaction, and when commitment of said each transaction after commitment of said selected transaction would be contrary to said order of performance such that said each transaction has a performed operation conflicting with a later performed operation in said selected transaction, aborting said each transaction;

wherein at least one transaction, which has results prepared and is ready to be committed, is aborted in the step (ii) when commitment of said at least one transaction after commitment of said selected transaction would be contrary to said order of performance such that said at least one transaction has a performed operation conflicting with a later performed operation in said selected transaction.

16. The method as claimed in claim 15, wherein said data is stored in said memory in the form of a directed graph, and wherein said method further comprises the step of removing from said graph data with respect to committed and aborted transactions.

17. The method as claimed in claim 16, further comprising the step of adding to said graph data indicating memory access conflict with respect to at least one of said transactions arising after beginning preparation of results of said at least one of said transactions.

18. The method as claimed in claim 15, wherein the transactions that are ready to be committed have predetermined priorities, one of the transactions that are ready to be committed has a highest one of the predetermined priorities, and the step of selecting said selected transaction includes comparing the predetermined priorities of the transactions that are ready to be committed and selecting the transaction having the highest one of the predetermined priorities among the transactions that are ready to be committed so that said selected transaction has the highest one of said predetermined priorities among the transactions that are ready to be committed.

19. The method as claimed in claim 15, wherein the step of selecting said selected transaction is based upon an order of said transactions in a list so that said selected transaction is a first transaction in said list among transactions in said list that are ready to be committed.

20. The method as claimed in claim 15, wherein the step of selecting said selected transaction is performed in response to a commit command from a coordinator.

21. The method as claimed in claim 15, wherein each of said transactions having said first conflicting operation and said second conflicting operation has an abort set of transactions for which commitment after commitment of said each of said transactions having said first conflicting operation and said second conflicting operation would be contrary to said order of performance, the abort set for one of said transactions having said first conflicting operation and said second conflicting operation having fewer members than the abort set for the other of said transactions having said first conflicting operation and said second conflicting operation, and wherein the step of selecting said selected transaction includes accessing said data in said memory, and from said data in said memory, determining which abort set of said transactions having said first conflicting operation and said second conflicting operation has fewer members, and selecting to be committed the one of said transactions having the abort set having fewer members, in order to minimize the number of transactions that are aborted in said step (ii).

22. The method as claimed in claim 15, which includes receiving from a coordinator a request specifying a transaction to be prepared and thereby identifying a specified transaction, and wherein preparation of results for said specified transaction is begun in said step (a) in response to receiving from said coordinator the request to prepare said specified transaction, and wherein the method further comprises the step of delaying acknowledgement to said coordinator of completion of preparation of said specified transaction until none of the transactions not yet committed nor aborted have a performed operation conflicting with a later performed operation in said specified transaction.

23. The method as claimed in claim 22, further comprising the step of terminating said delaying when said delaying persists for a predetermined duration of time.

24. The method as claimed in claim 23, further comprising the step of terminating said delaying upon receipt of a termination signal from a coordinator.

25. The method as claimed in claim 15, wherein said checking for memory access conflicts between transactions is performed after computing an address of a memory access operation.

26. The method as claimed in claim 15, wherein said checking for memory access conflicts between transactions includes comparing an address of a memory access operation for one transaction to addresses of memory access operations for other transactions, 27. The method as claimed in claim 15, wherein a read operation of a second one of said transactions reads write data written by a write operation of a first one of said transactions before said first one of said transactions is committed, and wherein said method further comprises the step of aborting all of said transactions that have read data written by aborted transactions.

28. A computer-implemented method of processing transactions in a computing system, said method comprising the steps of:
  a) receiving requests to perform transactions;
  b) preparing results of said transactions by scheduling and performing operations of said transactions on a real-time basis such that operations of some transactions are performed in accordance with availability of resources of said computing system before commitment of other transactions;
  c) checking for memory access conflicts between said transactions, not all of said transactions having memory access conflicts, and when said checking for memory access conflicts finds that one of said transactions has a first operation that conflicts with a second operation in another one of said transactions, recording in memory of said computing system an order of performance for the transactions having the first conflicting operation and the second conflicting operation, said checking for memory access conflicts between transactions being performed during the preparation of results for transactions having conflicting operations; and
  d) after results of said transactions having the first conflicting operation and the second conflicting operation have been prepared so that each one of said transactions having the first conflicting operation and the second conflicting operation is ready to be committed, selecting one of said transactions having the first conflicting operation and the second conflicting operation to be committed and thereby identifying a selected transaction, and determining an abort set of transactions for which commitment after commitment of said selected transaction would be contrary to said order of performance having been recorded in said memory of said computing system such that said abort set includes all transactions not yet committed nor aborted that have a performed operation conflicting with a later performed operation in said selected transaction, and in response to the selecting of said selected transaction:
  (i) committing to memory state of said computing system the prepared results of said selected transaction; and
  (ii) aborting all transactions in said abort set, wherein said abort set includes at least one transaction having results prepared and being ready to be committed and having a performed operation conflicting with a later performed operation in said selected transaction.

29. The method as claimed in claim 28, further including the step of delaying commitment of a transaction having prepared results so long as there are any other transactions not yet committed nor aborted having a performed operation conflicting with a later performed operation of said transaction having prepared results.

30. The method as claimed in claim 29, wherein said delaying of commitment is terminated after a predetermined duration of time by aborting every one of said transactions not yet committed nor aborted having a performed operation conflicting with a later performed operation of said transaction having prepared results.

31. The method as claimed in claim 28, wherein said requests are received from a coordinator, and said method further includes delaying acknowledgement to said coordinator of completion of preparation of a requested one of said transactions until none of said transactions that are not yet committed nor aborted have any performed operations that conflict with any later performed operations of said requested one of said transactions.

32. The method as claimed in claim 31, further comprising the step of terminating said delaying acknowledgement upon receipt of a termination signal from a coordinator.

33. The method as claimed in claim 28, wherein said checking for memory access conflicts between transactions is performed after computing an address of a memory access operation.

34. The method as claimed in claim 28, wherein said checking for memory access conflicts between transactions includes comparing an address of a memory access operation for one transaction to addresses of memory access operations for other transactions.

35. The method as claimed in claim 28, wherein a read operation of a second one of said transactions reads write data written by a write operation of a first one of said transactions before said first one of said transactions is committed, and wherein said method further comprises the step of aborting all of said transactions that have read data written by aborted transactions.

36. A digital computer system for processing transactions, said digital computer system comprising, in combination:
  a) means for preparing results of said transactions by scheduling and performing operations of said transactions on a real-time basis such that operations of some transactions are performed in accordance with availability of resources of said digital computer system before commitment of other transactions;
  b) means for checking for memory access conflicts between said transactions, not all of said transactions having memory access conflicts, and means responsive to said means for checking and operative when one of said transactions has a first operation that conflicts with a second operation in another one of said transactions for recording in memory of said computing system an order of performance for the transactions having the first conflicting operation and the second conflicting operation; and c) means operative after results of said transactions having the first conflicting operation and the second conflicting operation have been prepared so that each one of said transactions having the first conflicting operation and the second conflicting operation is ready to be committed for:

(i) selecting one of said transactions having the first conflicting operation and the second conflicting operation to be committed and thereby identifying a selected transaction, and committing to memory state of said computing system the prepared results of said selected transaction; and (ii) determining an abort set of transactions for which commitment after commitment of said selected transaction would be contrary to said order of performance having been recorded in said memory of said digital computer system such that said abort set includes all transactions not yet committed nor aborted that have a performed operation conflicting with a later performed operation of said selected transaction, and aborting all transactions in said abort set, wherein said abort set includes at least one transaction having results prepared and being ready to be committed and having a performed operation conflicting with a later performed operation of said selected transaction.

37. The digital computer system as claimed in claim 36, further including means for delaying commitment of said selected transaction when any transactions not yet committed nor aborted have a performed operation conflicting with a later performed operation of said selected transaction.

38. The digital computer system as claimed in claim 36, further including means for receiving from a coordinator a request specifying a transaction to be prepared and thereby identifying a specified transaction, and means for delaying acknowledgement to said coordinator of completion of preparation of said specified transaction until none of said transactions that are not yet committed nor aborted have any performed operations that conflict with any later performed operations of said specified transaction.

39. The digital computer system as claimed in claim 36, wherein said means for checking for memory access conflicts between said transactions includes means for detecting the performance of a memory access operation that conflicts with a memory access operation previously performed.

40. The digital computer system as claimed in claim 39, wherein said means for checking for memory access conflicts between said transactions includes means for comparing an address of a memory access operation for one transaction to addresses of memory access operations previously performed for other transactions.

41. The digital computer system as claimed in claim 36, wherein said means operative after results of said transactions having the first conflicting operation and the second conflicting operation have been prepared includes means for aborting all of said transactions that have read data written by aborted transactions.

42. A computer-implemented method of processing transactions in a computing system, said method comprising the steps of:

a) beginning preparation of results of said transactions;

b) when one of said transactions has a first operation that conflicts with a second operation in another one of said transactions, recording in memory of said computing system an order of performance for the transactions having the first conflicting operation and the second conflicting operation;

c) after results of said transactions having the first conflicting operation and the second conflicting operation have been prepared so that each one of said transactions having the first conflicting operation and the second conflicting operation is ready to be committed, selecting one of said transactions having the first conflicting operation and the second conflicting operation to be committed and thereby identifying a selected transaction, and determining an abort set of transactions for which commitment after commitment of said selected transaction would be contrary to said order of performance having been recorded in said memory of said computing system such that said abort set includes all transactions not yet committed nor aborted that have a performed operation conflicting with a later performed operation in said selected transaction, and in response to the selecting of said selected transaction:

(i) committing to memory state of said computing system the prepared results of said selected transaction; and (ii) aborting all transactions in said abort set, wherein each of said transactions having said first conflicting operation and said second conflicting operation has an abort set of transactions for which commitment after commitment of said each of said transactions having said first conflicting operation and said second conflicting operation would be contrary to said order of performance, the abort set for one of said transactions having said first conflicting operation and said second conflicting operation having fewer members than the abort set for the other of said transactions having said first conflicting operation and said second conflicting operation, and wherein the step of selecting said selected transaction includes accessing said order of performance in said memory, and from said order of performance in said memory, determining which abort set of said transactions having said first conflicting operation and said second conflicting operation has fewer members, and selecting to be committed the one of said transactions having the abort set having fewer members, in order to minimize the number of transactions that are aborted in said step (ii).

* * * * *